United States Patent
Malenke et al.

(10) Patent No.: US 9,468,218 B2
(45) Date of Patent: Oct. 18, 2016

(54) APPARATUS FOR STACKING, SINGULATING, AND DISPENSING PLIABLE FOOD PRODUCTS AND METHODS THEREFOR

(71) Applicant: Kraft Foods Group Brands LLC, Northfield, IL (US)

(72) Inventors: Mark E. Malenke, Sun Prairie, WI (US); Gary S. Rusch, De Forest, WI (US); Tod W. Heleniak, Green Bay, WI (US); Brian Adamski, Pulaski, WI (US); Larry D. Wierschke, Green Bay, WI (US); Scott A. Adler, Green Bay, WI (US)

(73) Assignee: Kraft Foods Group Brands LLC, Chicago, IL (US)

( * ) Notice: Subject to any disclaimer, the term of this patent is extended or adjusted under 35 U.S.C. 154(b) by 106 days.

(21) Appl. No.: 14/517,727

(22) Filed: Oct. 17, 2014

(65) Prior Publication Data
US 2015/0063974 A1    Mar. 5, 2015

Related U.S. Application Data

(62) Division of application No. 12/496,465, filed on Jul. 1, 2009, now Pat. No. 8,894,347.

(60) Provisional application No. 61/113,567, filed on Nov. 11, 2008.

(51) Int. Cl.
| | | |
|---|---|---|
| *B65H 1/30* | (2006.01) | |
| *B65H 1/02* | (2006.01) | |
| *A21C 9/08* | (2006.01) | |
| *B65H 3/08* | (2006.01) | |
| *B65B 43/18* | (2006.01) | |
| *B65B 7/28* | (2006.01) | |
| *B65G 47/24* | (2006.01) | |

(52) U.S. Cl.
CPC .................. *A21C 9/086* (2013.01); *A21C 9/08* (2013.01); *B65B 7/2807* (2013.01); *B65B 43/18* (2013.01); *B65B 43/185* (2013.01); *B65G 47/24* (2013.01); *B65H 3/085* (2013.01); *B65H 2701/1718* (2013.01)

(58) Field of Classification Search
CPC .......... B65H 1/30; B65H 1/025; B65H 1/24; B65C 9/10
USPC ........ 198/462.1, 786; 221/11; 271/146, 149, 271/157, 31.1; 294/183, 188, 64.2; 414/795.4, 795.8, 796.1, 797, 797.4; 53/532, 542
See application file for complete search history.

(56) References Cited

U.S. PATENT DOCUMENTS

| | | | |
|---|---|---|---|
| 1,787,077 A | | 12/1930 | Kruse |
| 2,304,146 A | * | 12/1942 | Brinton .................. B67B 3/062 221/13 |
| 2,397,297 A | * | 3/1946 | Sonnenberg .............. B67B 3/02 221/211 |

(Continued)

*Primary Examiner* — Gregory Adams
(74) *Attorney, Agent, or Firm* — Fitch, Even, Tabin & Flannery LLP

(57) ABSTRACT

An apparatus for handling food products comprises an alignment trough disposed at an incline for holding a stack of the food products at an incline. The alignment trough defines a portion of a passage upon which the food products travel. The stack defines a bottom food product. At least one movable member extends into the passage to control the separation of the bottom food product from the remainder of the stack by moving to provide clearance fro the food product to pass.

21 Claims, 25 Drawing Sheets

(56) References Cited

U.S. PATENT DOCUMENTS

| | | | | |
|---|---|---|---|---|
| 2,745,665 A | * | 5/1956 | Labombarde | B65H 45/26 269/21 |
| 2,811,087 A | | 10/1957 | Nigrelli | |
| 2,836,328 A | * | 5/1958 | Kinney | B65B 7/2807 221/172 |
| 3,100,583 A | | 8/1963 | Erickson | |
| 3,108,714 A | | 10/1963 | Obrien | |
| 3,130,967 A | | 4/1964 | Le Brell | |
| 3,182,820 A | | 5/1965 | Gardner | |
| 3,211,329 A | | 10/1965 | Boyd | |
| 3,259,384 A | * | 7/1966 | Hittenberger | B65H 3/62 271/149 |
| 3,291,483 A | * | 12/1966 | Stanley | B65C 9/10 156/DIG. 29 |
| 3,401,831 A | | 9/1968 | Saurenmann | |
| 3,655,072 A | * | 4/1972 | Bateman | B65H 1/06 221/176 |
| 3,817,516 A | | 6/1974 | Lazzarotti et al. | |
| 4,295,645 A | * | 10/1981 | Nahar | B65H 1/08 271/146 |
| 4,299,379 A | | 11/1981 | Preston et al. | |
| 4,391,560 A | | 7/1983 | Fardin | |
| 4,505,467 A | * | 3/1985 | Brocklehurst | B65C 9/10 156/DIG. 31 |
| 4,534,549 A | | 8/1985 | Eberle | |
| 4,550,550 A | * | 11/1985 | Scott | B65B 25/148 209/558 |
| 4,588,180 A | * | 5/1986 | Ballestrazzi | B65H 1/24 271/150 |
| 4,592,542 A | | 6/1986 | Selak | |
| 4,641,489 A | * | 2/1987 | Wood | B65B 27/08 271/150 |
| 4,674,935 A | | 6/1987 | Feliks et al. | |
| 4,789,148 A | | 12/1988 | Noguchi et al. | |
| 4,884,795 A | | 12/1989 | Vander Syde | |
| 4,973,038 A | * | 11/1990 | Curley | B65H 1/025 271/146 |
| 4,981,292 A | * | 1/1991 | Cosgrove | B65H 1/025 271/150 |
| 5,131,899 A | * | 7/1992 | Nagahashi | B65B 43/145 271/104 |
| 5,244,199 A | * | 9/1993 | Wood | B65H 1/30 271/150 |
| 5,471,822 A | | 12/1995 | Dugan et al. | |
| 5,720,593 A | | 2/1998 | Pleake | |
| 5,779,432 A | * | 7/1998 | Pena | B65G 57/11 198/418.6 |
| 5,863,177 A | | 1/1999 | Carson et al. | |
| 6,036,186 A | * | 3/2000 | Glanzmann | B65H 1/025 271/150 |
| 6,053,695 A | | 4/2000 | Longoria et al. | |
| 6,168,370 B1 | | 1/2001 | Longoria et al. | |
| 6,182,814 B1 | | 2/2001 | Koehler | |
| 6,247,694 B1 | * | 6/2001 | Nonnemacher | B65H 1/30 270/52.18 |
| 6,402,455 B1 | | 6/2002 | Vincent et al. | |
| 6,409,462 B2 | | 6/2002 | Newsome et al. | |
| 6,543,762 B1 | * | 4/2003 | Quadalti | B65H 1/30 221/11 |
| 7,370,456 B2 | | 5/2008 | Ichikawa et al. | |
| 2003/0146240 A1 | | 8/2003 | Kawolics et al. | |
| 2007/0104564 A1 | * | 5/2007 | Covarrubias | B65G 59/106 414/795.4 |

* cited by examiner

US 9,468,218 B2

APPARATUS FOR STACKING, SINGULATING, AND DISPENSING PLIABLE FOOD PRODUCTS AND METHODS THEREFOR

CROSS-REFERENCE TO RELATED APPLICATION

This application is a divisional of U.S. application Ser. No. 12/496,465, filed Jul. 1, 2009, which claims the benefit of U.S. Provisional Application No. 61/113,567, filed Nov. 11, 2008, each of which is incorporated herein in its entirety by reference.

FIELD

This disclosure relates generally to systems that handle food products, and more specifically to an automated apparatus that stacks, singulates, and dispenses pliable food products.

BACKGROUND

Customers often prefer to purchase food products in packages containing a specific number of the food products. For example, a pizza meal package may contain a specified number of palm-size pizza crusts. During the packaging process, the pizza crusts are typically grouped into the desired number of pizza crusts for each package (such as three) and placed in each package manually by hand. Such a manual process is time consuming and costly compared to an automatic process.

Many of these counted food products such as the pizza crusts, however, are thin and pliable. Additionally, the manufacturing process is such that each crust is a slightly different size and has an exterior with adherent properties. These features make it extremely difficult to provide an automated system that aligns the crusts so they can be automatically divided into groups with a specified number of crusts, and then placed into packages. For instance, when too much pressure is applied to a stack of the crusts, the crusts may stick together so that attempting to remove one crust from the stack may destroy the crust and/or adjacent crusts. Also, the crusts may pop out of alignment when a stack of the crusts are being conveyed through a turn or bend on the system. In this case, the forward momentum of the crust may cause the crust to veer or jump away from the new desired course on the downstream part of the turn. Therefore, what is desired is a system that stacks the crusts, singulates the crusts for placement into groups of crusts of a specified number, and dispenses the groups of crusts into packages while avoiding the problems mentioned above.

SUMMARY

An automatic handling system or apparatus for stacking, singulating, and dispensing food products solves one or more of the problems mentioned above. In one form, the food products are pliable, palm-size pizza crusts, bread, or pitas that are pancake shaped, each with a thin edge and generally flat faces. The food products can be stacked with the flat faces against each other but have a tendency to stick to each other if too much force is applied to the stack. In one example form, the handling system has a feed trough for conveniently loading a supply of the food products onto the system. The feed trough defines one or more channels that hold an array of the food products upright on their thin edges for quick placement of a large number of the food products onto the feed trough. The feed trough then conveys the supply of food products to an inclined alignment trough that forms an inclined stack of the food products.

The alignment trough is inclined at a steeper angle relative to the feed trough to form a smaller, lighter stack of the food products. The alignment trough also has an alignment mechanism that applies a lateral force on the food products in the stack to keep the food products aligned in the stack. In one form, one or more rollers engage the food products in the alignment trough to apply the lateral force. This engagement jostles, rotates, or otherwise shifts the food products so that the food products do not jump out of alignment in the stack as the food products turn from the more horizontal feed trough to the alignment trough. The engagement with the rollers also helps to limit the food products sticking to each other. A sensor may be provided to sense the presence of the food products on the alignment trough to activate a conveyor belt on the feed trough when the alignment trough is empty.

A separation device separates the single bottom food product from the remainder of the stack on the alignment trough. In one example form, this is accomplished with the use of partial vacuum to temporarily fix the separation device to the bottom food product. The separation device has a cup with an interior and an opening to the interior that faces the alignment trough to engage the bottom food product. The interior of the cup includes at least one orifice that faces laterally to reduce pressure in the interior of the cup. This orientation of the orifice causes the food product to receive weaker partial vacuum pressure at the opening of the cup sufficient to move the food product without damaging it.

This singulation process is assisted by a gate or frame positioned at the bottom of the stack and that has a movable member to control the separation of the bottom most food product from the remainder of the stack and through the frame. The movable member, in one form, is a resilient member configured to have sufficient resistance to deformation so that the stack cannot pass the resilient member due to its weight alone while an external force can still flex the resilient member to separate the bottom most food product from the stack. The alignment trough is placed at an incline, as mentioned above, so that the resilient member does not need to withstand the full weight of the stack. The retraction of the bottom food product with the separation device causes the resilient member to flex or bend to provide clearance for the food product to move through the frame. The resilient member then shifts back to its natural flat orientation in time to retain and hold the remainder of the stack.

The ability of the food products to elastically deform allows the suction to be applied without damaging the food product, and reduces the outer diameter of the food product so that the resilient member does not need to flex or shift as much to provide clearance for the food product to pass as with the full diameter of the food product.

The separation device moves the single food product from the alignment trough to a level even with a slide. A driver then engages the single food product and thrusts the single food product down the slide and to a collection point such as into a chute. Once placed in the chute, the food products have been rotated 90 degrees so that the flat faces of the food product generally extend horizontally. This orientation is convenient for loading packages that require a vertical pile of the food products. The process of moving a single food product into the chute is repeated until a desired number of food products are stacked or collected within the chute. The chute is then open to drop the group of food products into a package moving along a conveyor belt beneath the chute. This entire process may run continuously as needed and may run on multiple machines or each machine may have multiple lanes to increase the production level.

DETAILED DESCRIPTION

Figure 1:
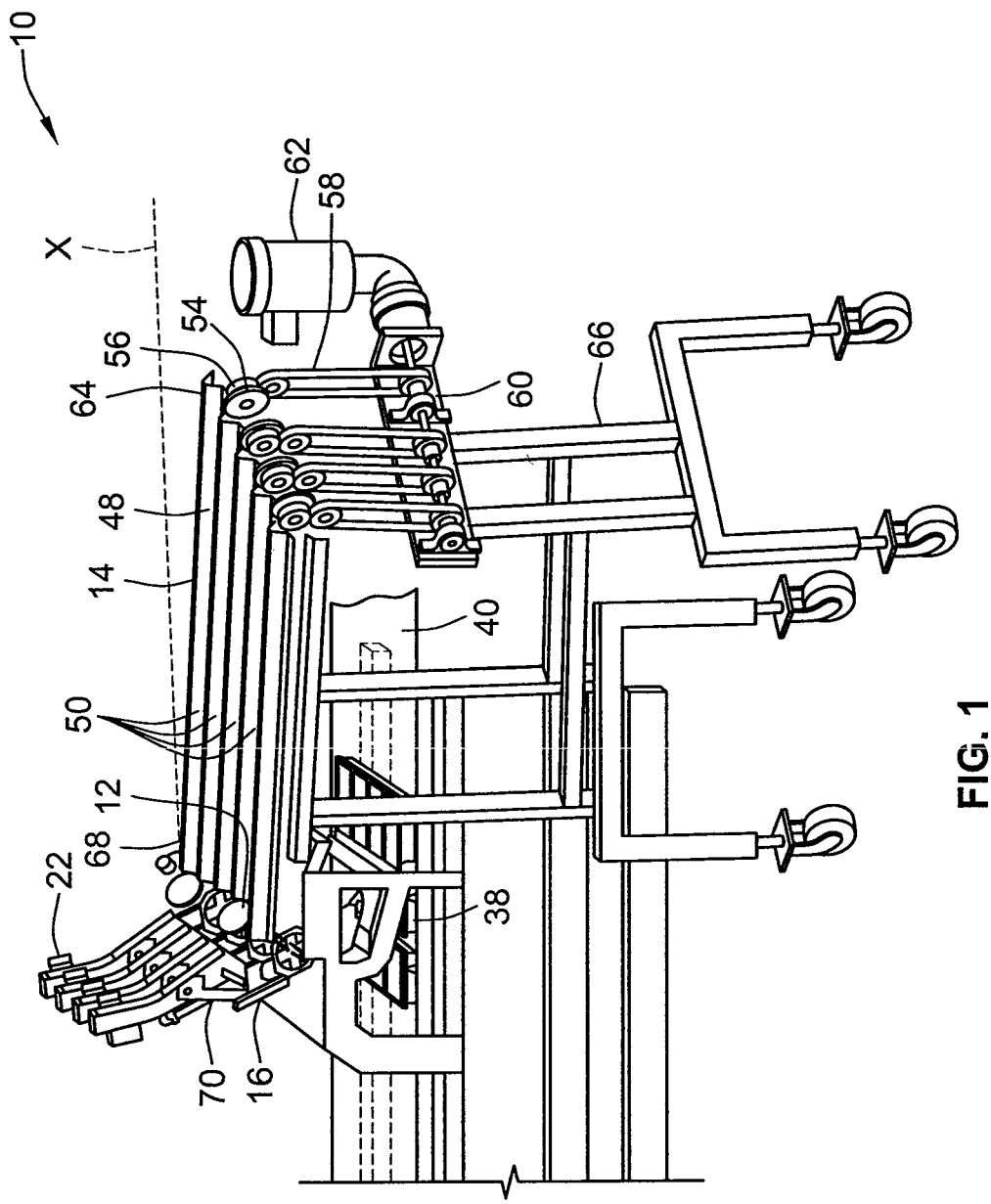
FIG. 1 is a perspective side view of a handling system in accordance to the present invention.
Figure 2:
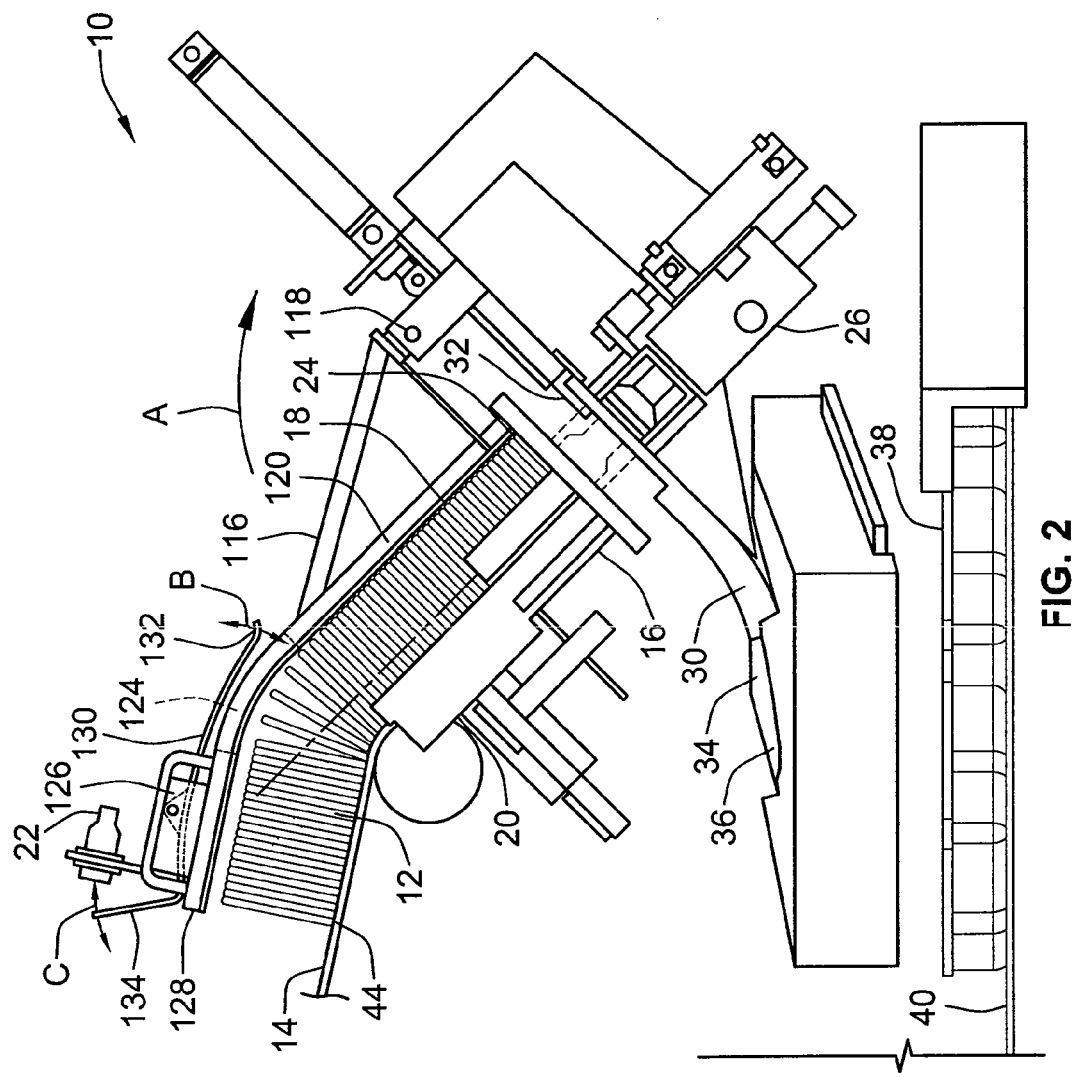
FIG. 2 is a fragmented side view of a portion of the handling system of FIG. 1.
Figure 3:
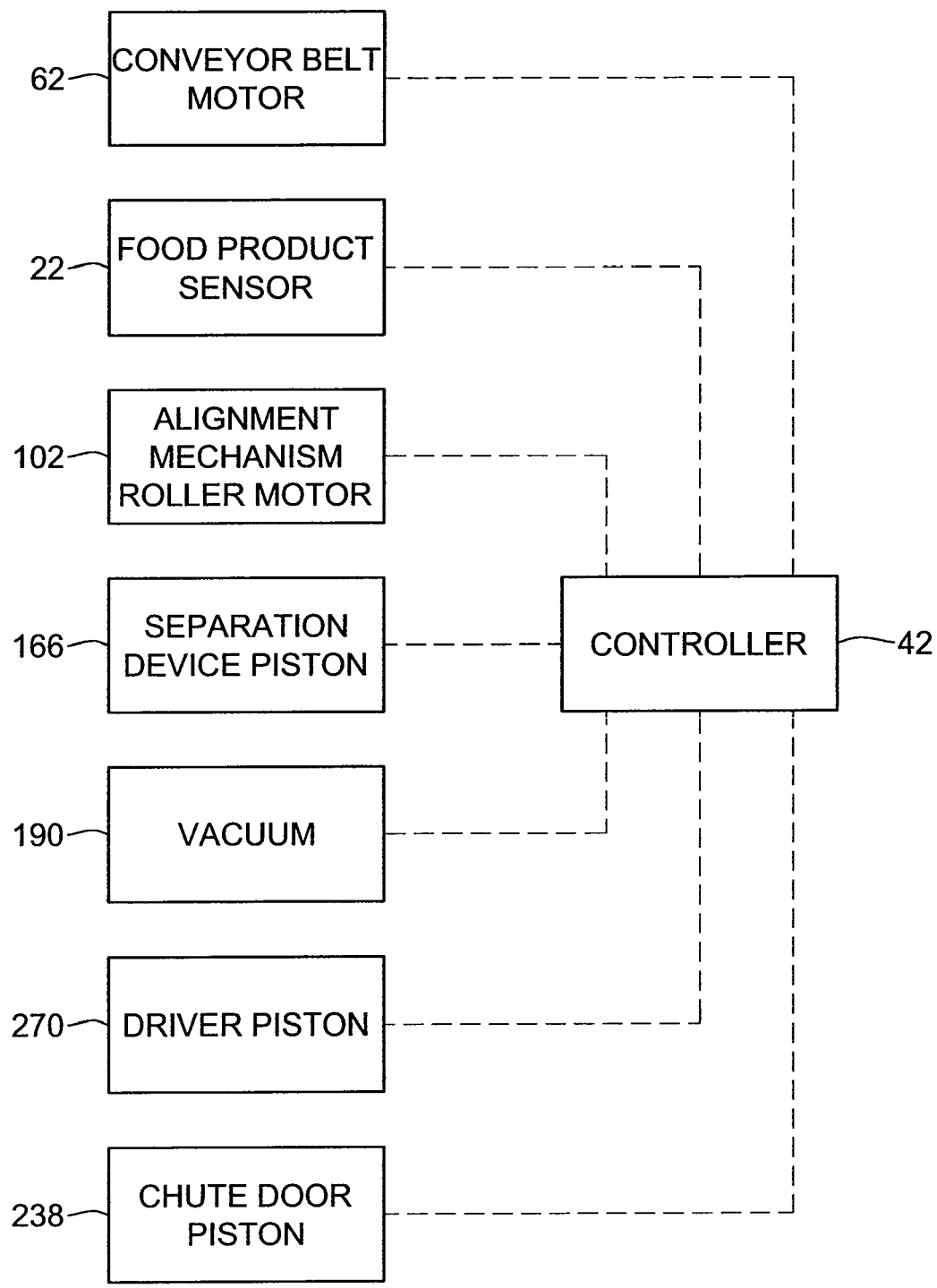
FIG. 3 is a schematic of the handling system of FIG. 1.

Referring to FIGS. 1-3, an apparatus 10 is provided for stacking, singulating, and dispensing pliable, thin food products 12 into groups with a specified number of food products in each group. Generally, and in one example form, the apparatus 10 has a feed trough 14 for conveniently and quickly loading food products 12 onto the apparatus. The feed trough 14 conveys the food products 12 to an inclined alignment trough 16 that carries a shorter, lighter stack 18 of the food products relative to the full supply of food products on the feed trough 14. The alignment trough 16 has an alignment mechanism 20 to apply lateral force on the food products 12 to maintain the food products in the stack 18. A sensor 22 is positioned above the alignment trough 16 to activate a conveyor belt 54 on the feed trough 14 when a low amount of food products 12 are present in the alignment trough 16 (i.e., the alignment trough is not full).

Figure 9:
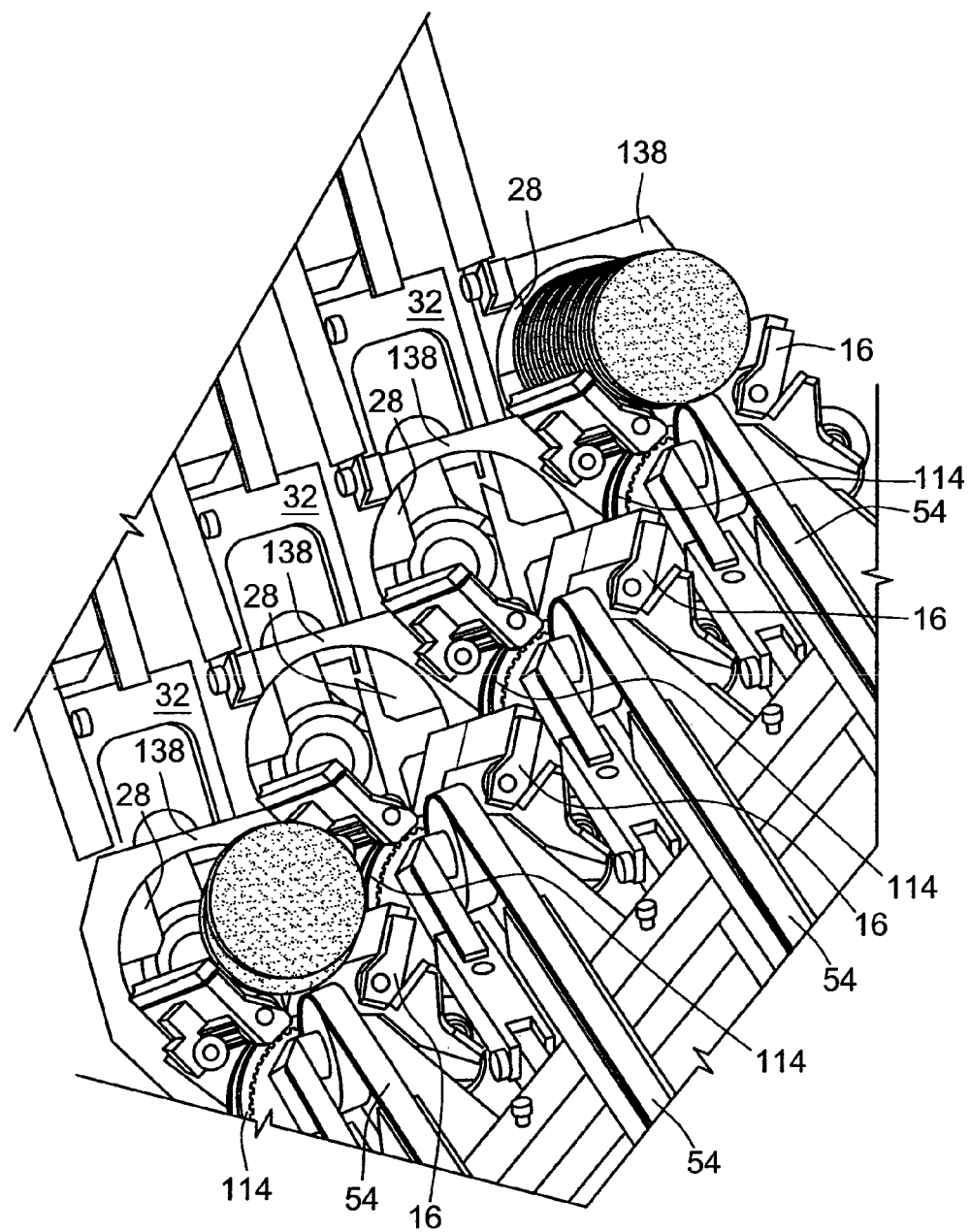
FIG. 9 is yet another upper perspective view of the intersection of the feed trough and an alignment trough of the system of FIG. 1 shown with trough plates removed.
Figure 10:
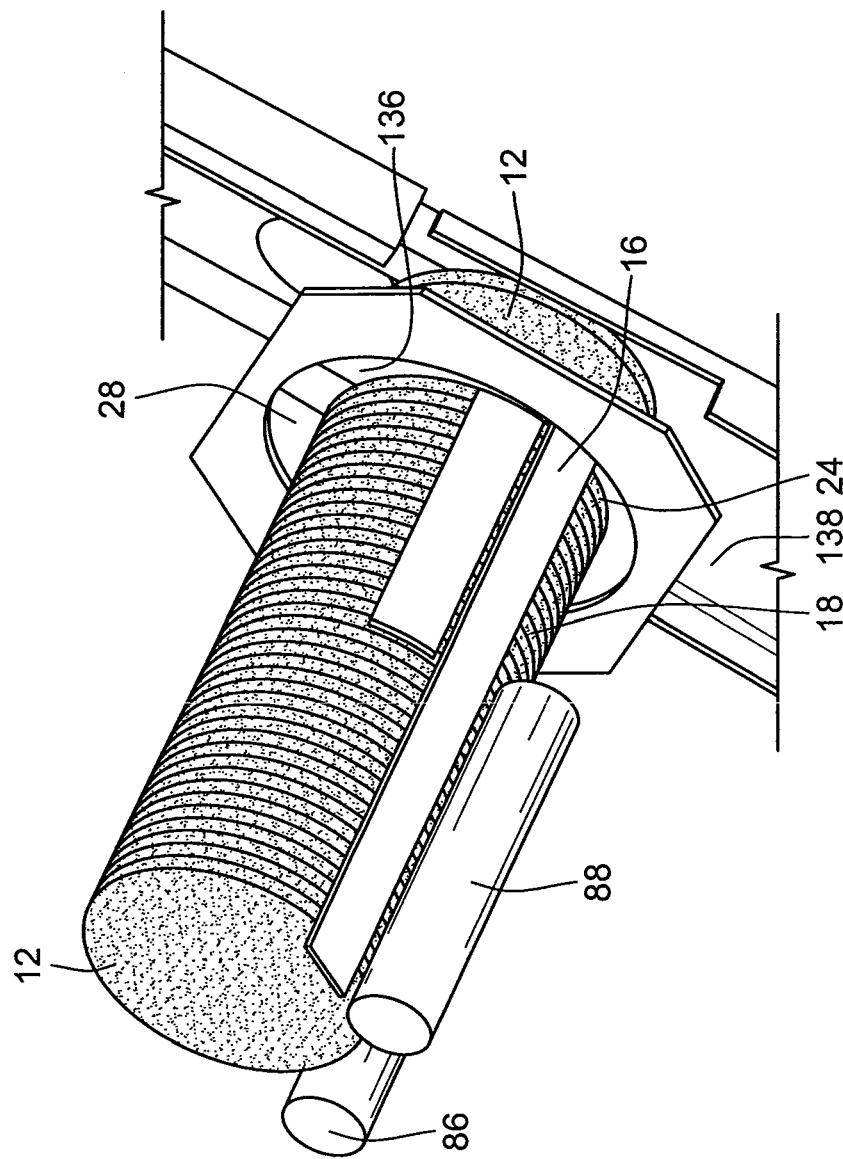
FIG. 10 is a fragmented, perspective side view of the alignment trough of the system of FIG. 1 with a stack of food products.
Figure 11:
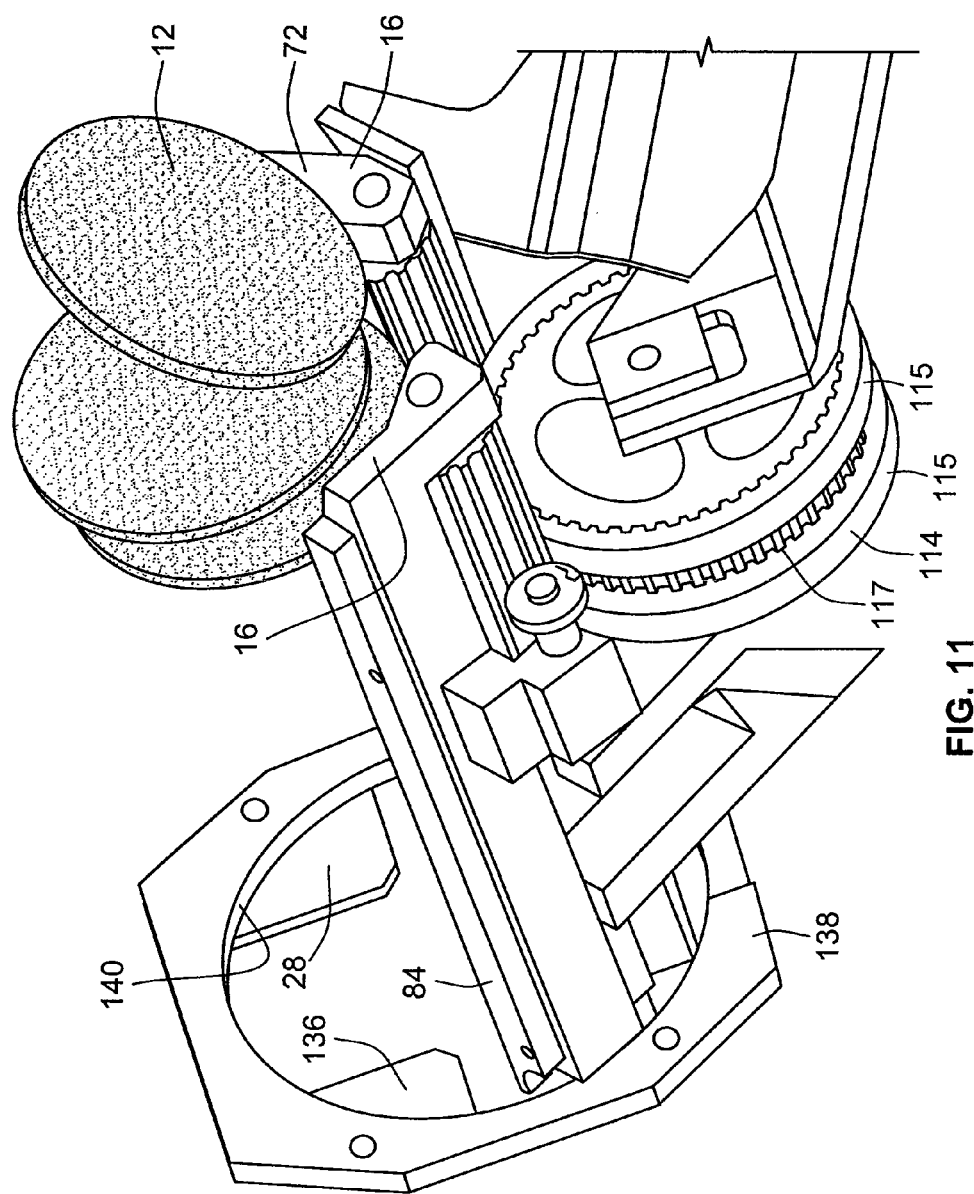
FIG. 11 is a fragmented, side close-up perspective view of the alignment trough of the system of FIG. 1.

A bottom food product 24 in the stack 18 is removed from the remainder of the stack 18 by a separation or singulation device 26. In one form, the separation device 26 uses partial vacuum to temporarily fix the food product to the separation device 26. A movable member 28 (FIGS. 9 and 13) at the bottom of the stack 18 only permits the separation device 26 to move a specified number of food products 12 from the stack 18. In one form, the bottom food product 24 is moved from the stack 18 one at a time. To facilitate this, the alignment trough 16 is inclined so that the movable member 28 does not hold the full weight of the stack 18.

The separation device 26 moves the bottom food product 24 to a slide 30, and a driver 32 engages the bottom food product 24 to move the bottom food product 24 down the slide and to a collection point 34, such as chute 36. When the separation device 26 removes food product from the stack 18 one at a time, the separation device 26 and driver 32 repeat this process for a specified number of times to place a desired number of the food products 12 in the chute 36. Once a specified number of food products 12 are placed in a chute 36, the chute 36 is opened and the pile or group of food products 12 drop into a package 38 moving along a conveyor belt 40 under the chutes 36. A controller 42 may be used to control the different automatic devices and mechanisms as shown schematically on FIG. 3.

Figure 4:
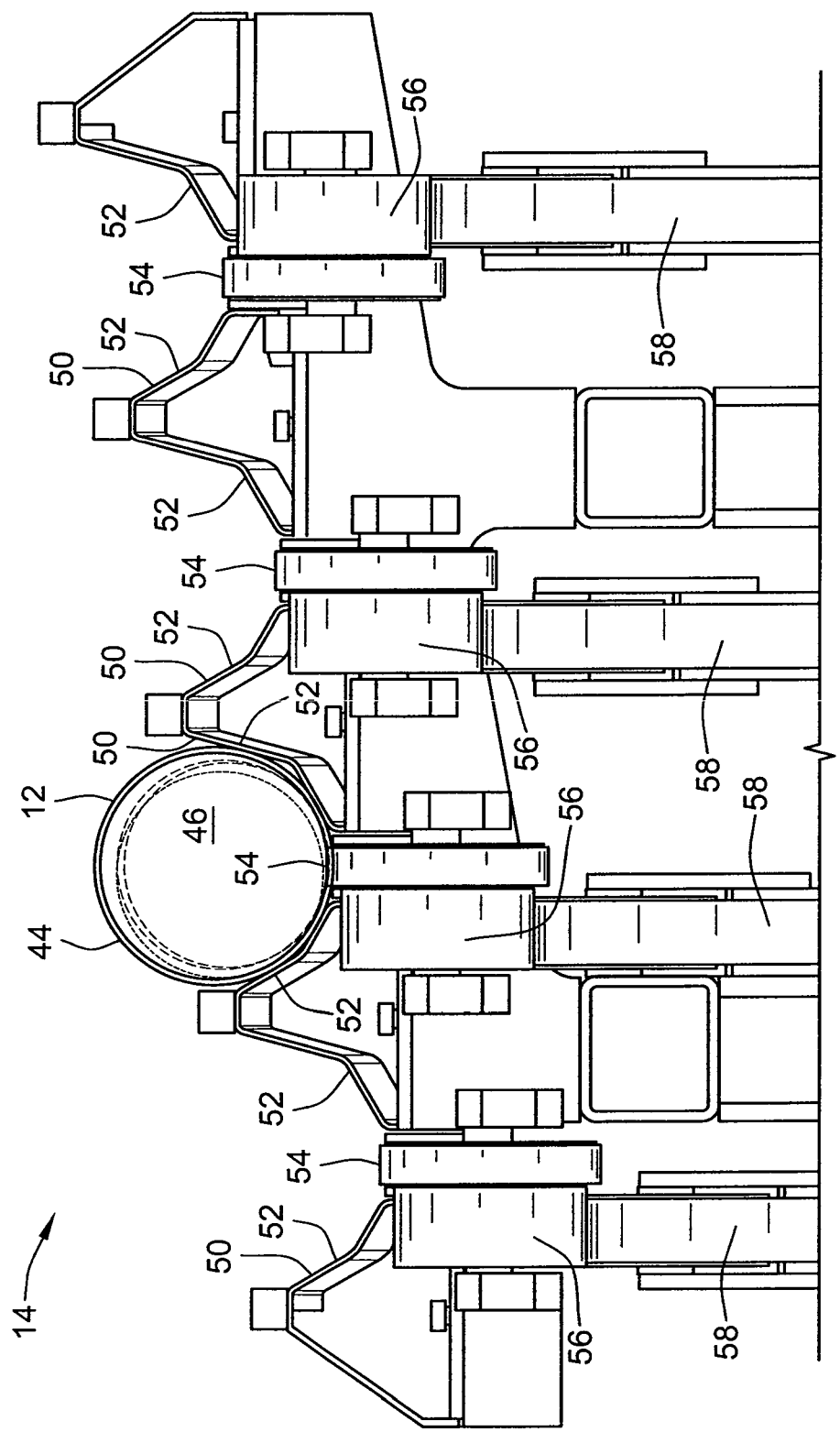
FIG. 4 is a front end view of a feed trough for the handling system of FIG. 1.

Now in more detail, in one form, the food products 12 are pliable, palm-size pizza crusts, breads, or pitas that are pancake shaped, each with a thin edge 44 and a generally flat face 46 (indicated on FIG. 4). The food products 12 can be stacked with the flat faces 46 against each other but have a tendency to stick to each other if too much force is applied to the stack.

Figure 5:
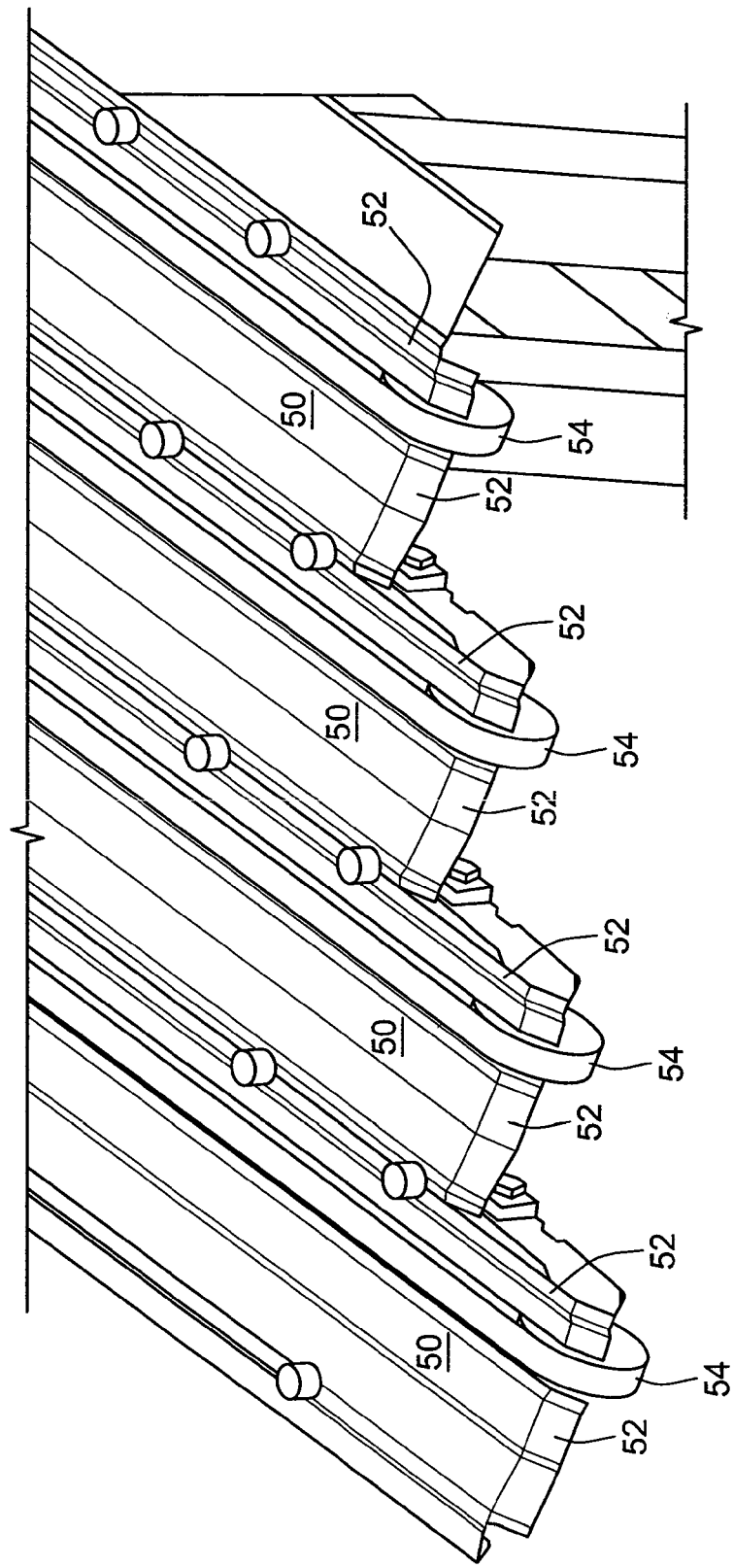
FIG. 5 is an upper perspective view of the feed trough of FIG. 4.

Referring to FIGS. 1, 4 and 5, the feed trough 14 includes a table 48 with at least one, but here multiple elongate channels or lanes 50. Each channel 50 is generally U-shaped and formed by elongate, metal or plastic sidewalls 52 and a conveyor belt 54 at the bottom of each channel 50 (best seen in FIG. 4). The conveyor belts 54 are operably interconnected at a driving end 64 of the feed trough 14 by wheels 56 to drive belts 58 which are, in turn, driven by a drive shaft 60 from a conveyor belt motor 62. The motor 62 may be controlled by controller 42 and/or may be operated independently. The table 48 also includes a frame 66 with legs to hold the channels 50 in a desired orientation.

The channels 50 are shaped so that a large supply of multiple food products 12, supplied in packs of twenty for example, can be quickly laid horizontally in the channels 50 either by machine or manually. The sidewalls 52 of the channels 50 hold the food products on their thin edges 44 so that the generally flat faces 46 of the food products 12 extend generally vertically. In one form, the channels 50 have a slight incline (as shown by the dash line indicated at X on FIG. 1), such as 20 degrees from horizontal in one example, so that the last food product 12 (i.e., closest to motor 62) in a line of food products in a channel 50 will not fall over and jam the channel. The conveyor belts 54 may be on while the feed trough 14 is being loaded. The conveyor belts 54 rotate toward a handling end 68 of the feed trough 14, opposite the driving end 64 of the feed trough 14, to provide the food products 12 to the alignment trough 16.

Referring to FIGS. 6-11, a support frame 70 holds the alignment troughs 16, the separation devices 26, the slides 30, the drivers 32, and the chutes 36. The support frame 70 is connected to the handling end portion 68 of the feed trough 14 to position each conveyor belt 54 at an upper portion 72 of one of the alignment troughs 16.

Figure 12:
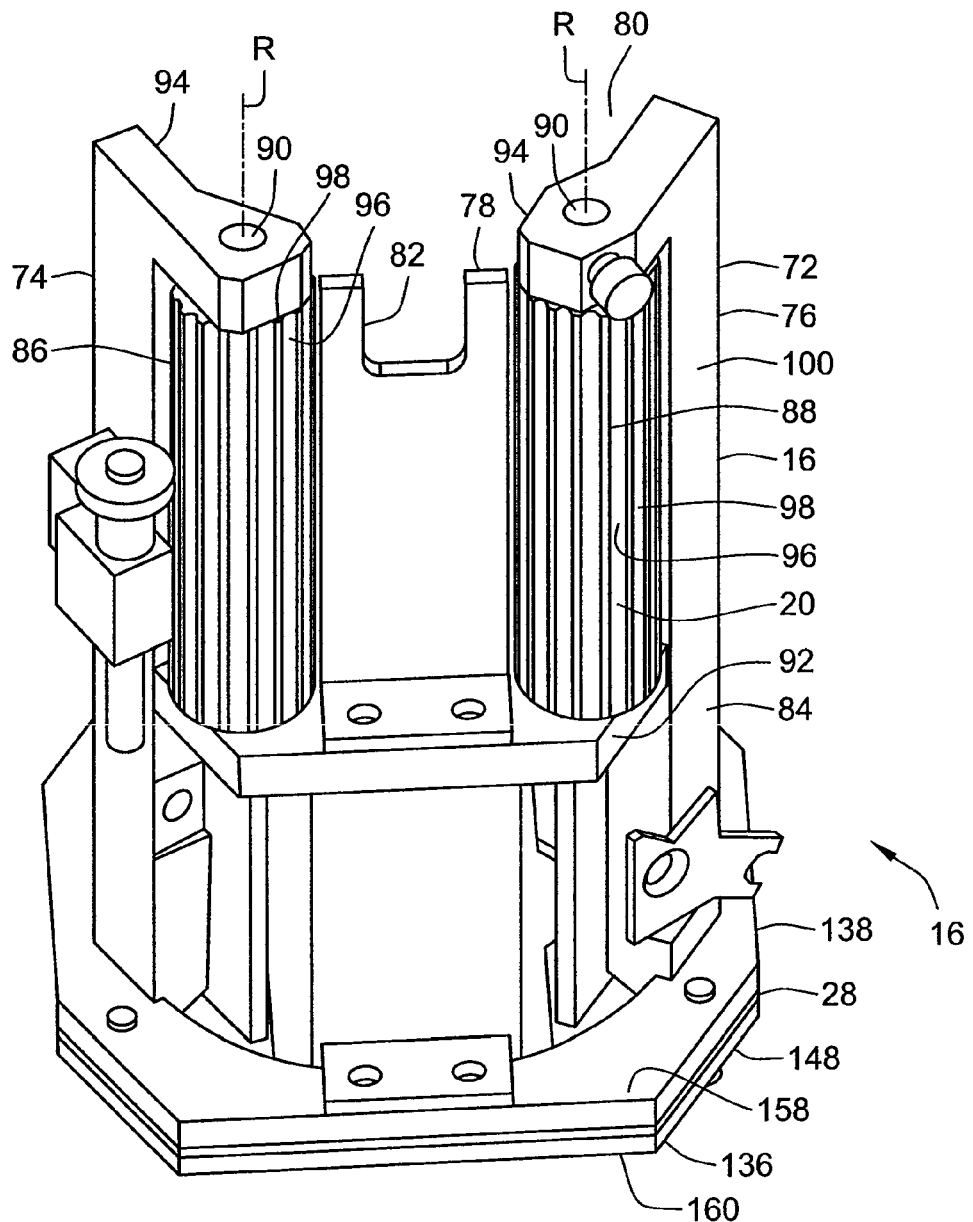
FIG. 12 is a bottom view of the alignment trough of the system of FIG. 1.
Figure 13:
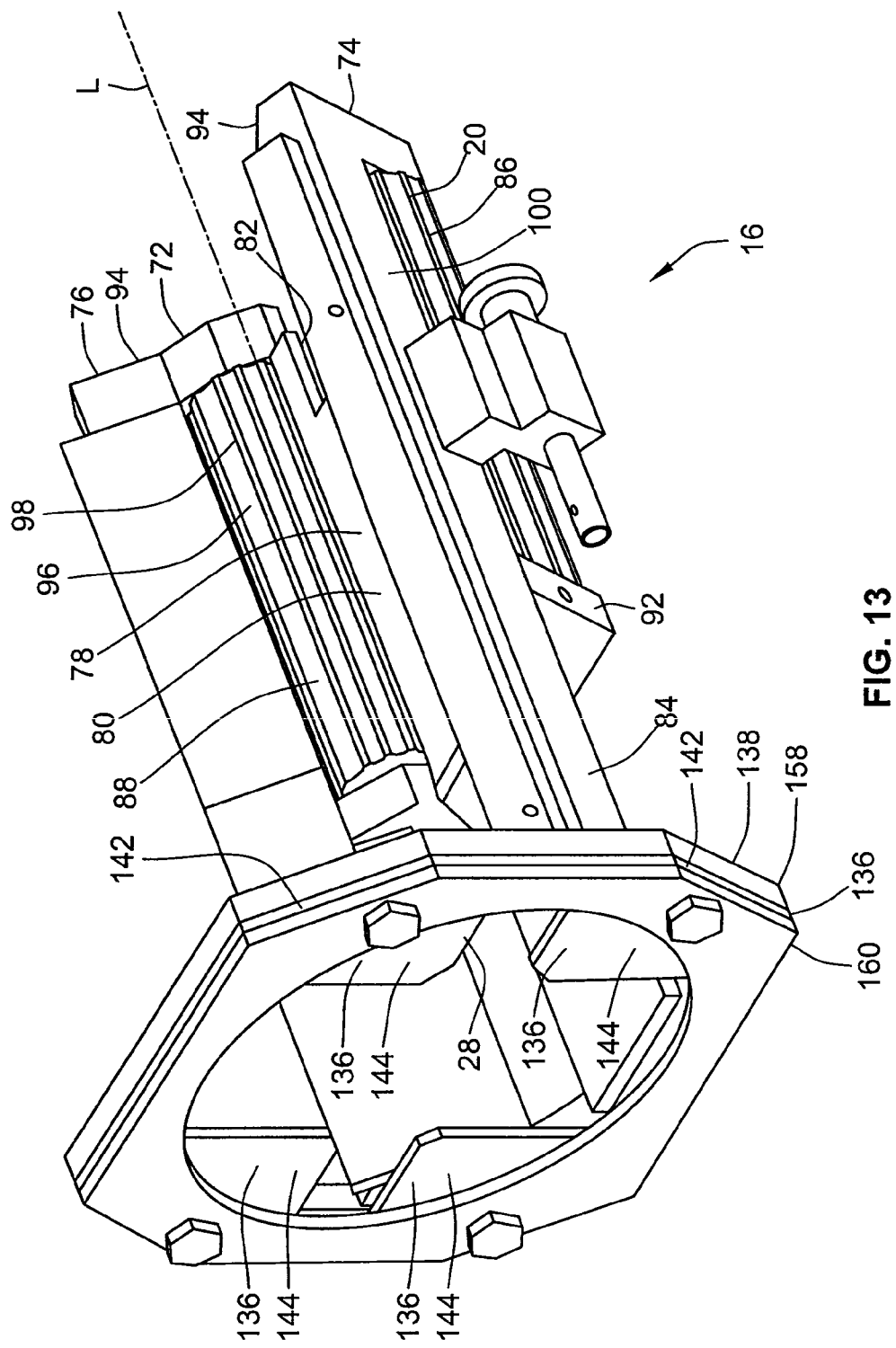
FIG. 13 is a side and front perspective view of the alignment trough for the system of FIG. 1.

Referring to FIGS. 12-13, the alignment trough 16 generally defines a longitudinal axis or direction L, and has two sidewalls 74 and 76 on opposing lateral sides of a middle wall 78. This structure forms a portion of a longitudinal passage 80 along direction L and so that the food product 12 is received amid the middle wall 78 and sidewalls 74 and 76. The sidewalls 74 and 76 extend generally parallel to the longitudinal axis L and are slanted downward as the sidewalls 74 and 76 extend toward each other and the middle wall 78. The sidewalls 74 and 76 may have an interior panel of plastic or other material to form a slippery surface upon which the food products 12 will easily side down. The upper portion 72 of each alignment trough 16 has a groove 82 on bottom wall 78 to provide clearance for the conveyor belt 54.

In the illustrated form, the alignment trough 16 is inclined (FIG. 18), rather than simply forming a perfectly vertical chute, so that the sidewalls 74 and 76 and middle wall 78 hold some of the weight of the stack 18. The incline also is at a different angle from horizontal to that of the feed trough 14 so that the size of the stack 18 held by the alignment trough 16 is limited, thereby limiting the total weight on the alignment trough 16. In one example, the alignment trough 16 extends at 45 degrees from horizontal. This structure also reduces the weight that is applied to the movable member 28 disposed at a lower end portion 84 of the alignment trough 16 and that is used to control the motion of the food products 12 in the stack 18 as explained in greater detail below.

The alignment trough 16 guides the stack 18 along the passage 80 generally in the longitudinal direction L while the stack moves down due to gravity. As the conveyor belt 54 moves the food products 12 onto the alignment trough 16 from the feed trough 14, the food products 12 change direction to the sharper downward incline of the alignment trough 16. Either this forward momentum, or two or more food products 12 sticking together, may cause one or more of the food products to veer upward and out of alignment with the stack on the alignment trough 16. In order to maintain the food products 12 in alignment with the longitudinal direction L, or to shift a stray food product 12 back into alignment, the alignment mechanism 20 mentioned above applies a lateral force, relative to the longitudinal direction L, on the food products 12 in the alignment trough 16.

In one form, the alignment mechanism 20 may be disposed anywhere in the vicinity of the alignment trough 16 as long as it is positioned to apply the lateral force on the food products 12 (such as from above the alignment trough 16). In the illustrated form, however, the alignment mechanism 20 has at least one roller, and here two rollers 86 and 88, respectively mounted at sidewalls 74 and 76, and specifically between a sidewall 74 or 76 and the middle wall 78. Each roller 86 and 88 is mounted on an axle 90 that extends generally parallel to the longitudinal direction L, and is mounted between a cross beam 92 and an upper end portion 94 of a respective sidewall 74 or 76. The rollers 86 and 88 have an array of generally longitudinally extending grooves or flutes 96 to form an array of edges 98. So configured, the rollers 86 and 88 have an axis of rotation R extending generally parallel to the longitudinal direction L so that the edges 98 engage the thin edges 44 of the food products 12 to move the food products laterally. This action causes the food products 12 to rotate and/or shift laterally back and forth, jostling the food products, and limiting one food product from sticking to an adjacent food product so the food products stay in alignment in the stack 18. To alleviate the alignment problems mentioned above, the at least one roller extends at least along a portion of the upper half 100 of the alignment trough 16 but may extend only on a portion of the upper half 100.

Figure 6:
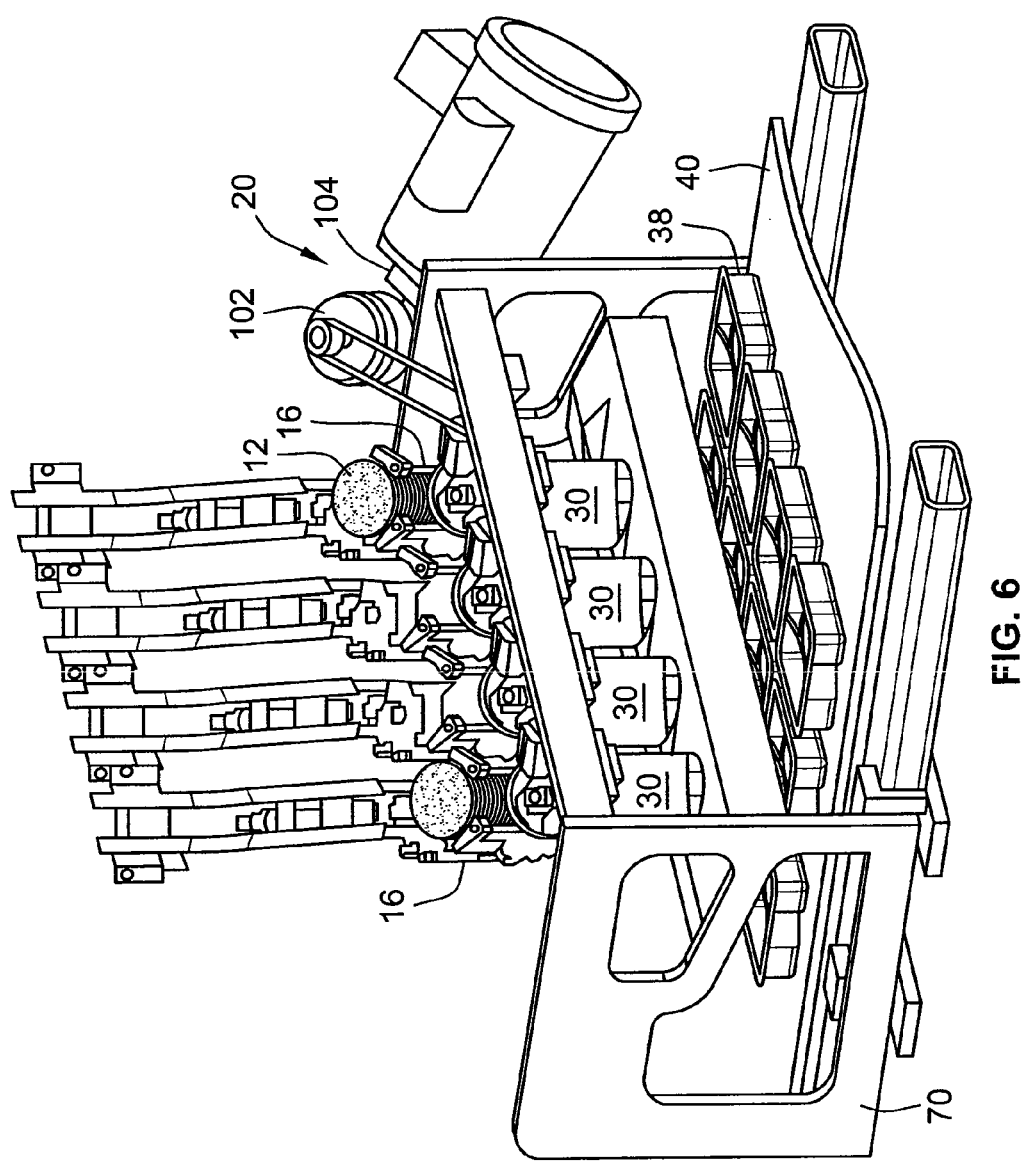
FIG. 6 is a left perspective view of the handling portion of the system of FIG. 1.
Figure 7:
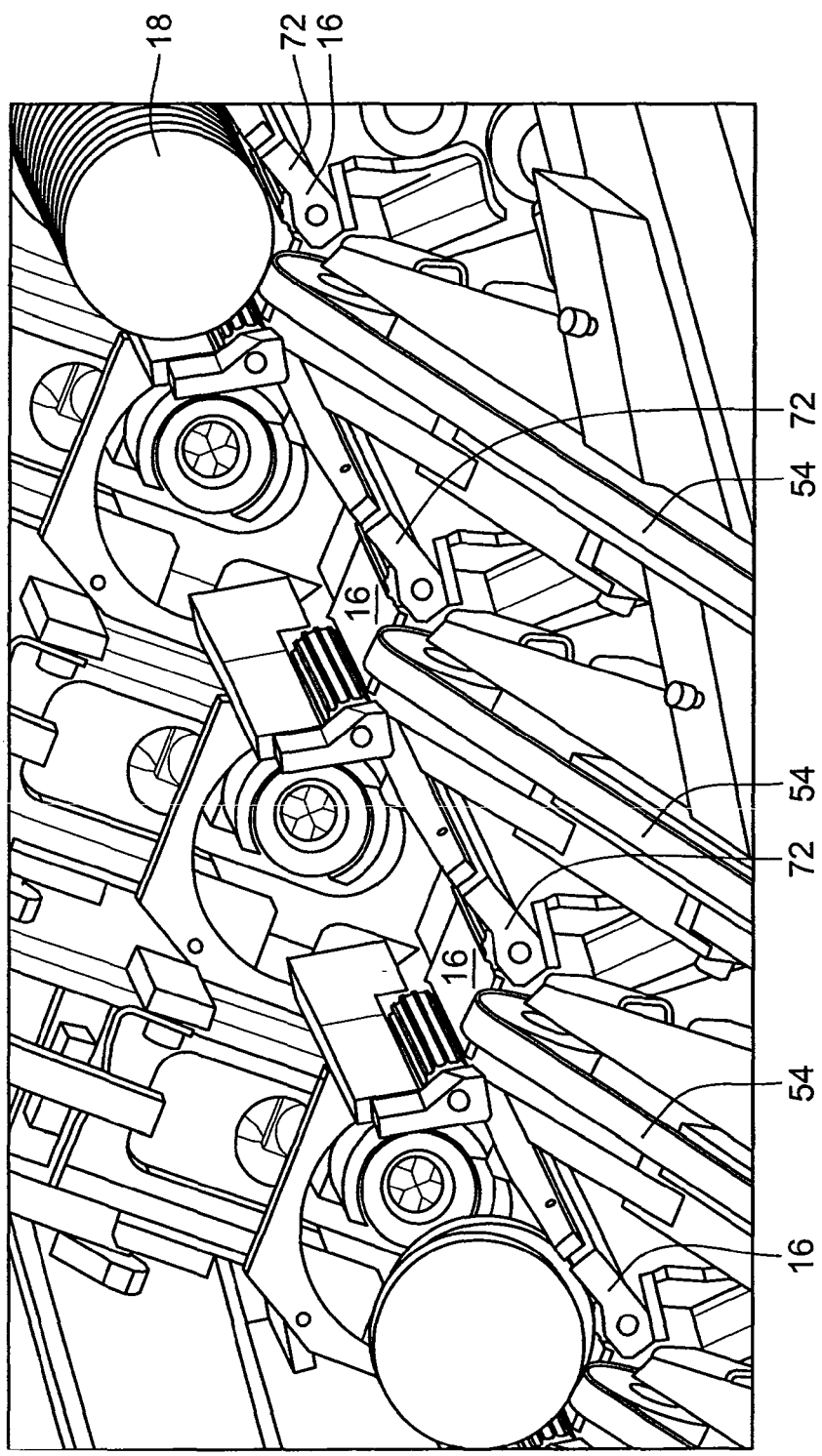
FIG. 7 is an upper perspective view of the intersection of the feed trough and an alignment trough of the system of FIG. 1 shown with trough plates removed.
Figure 8:
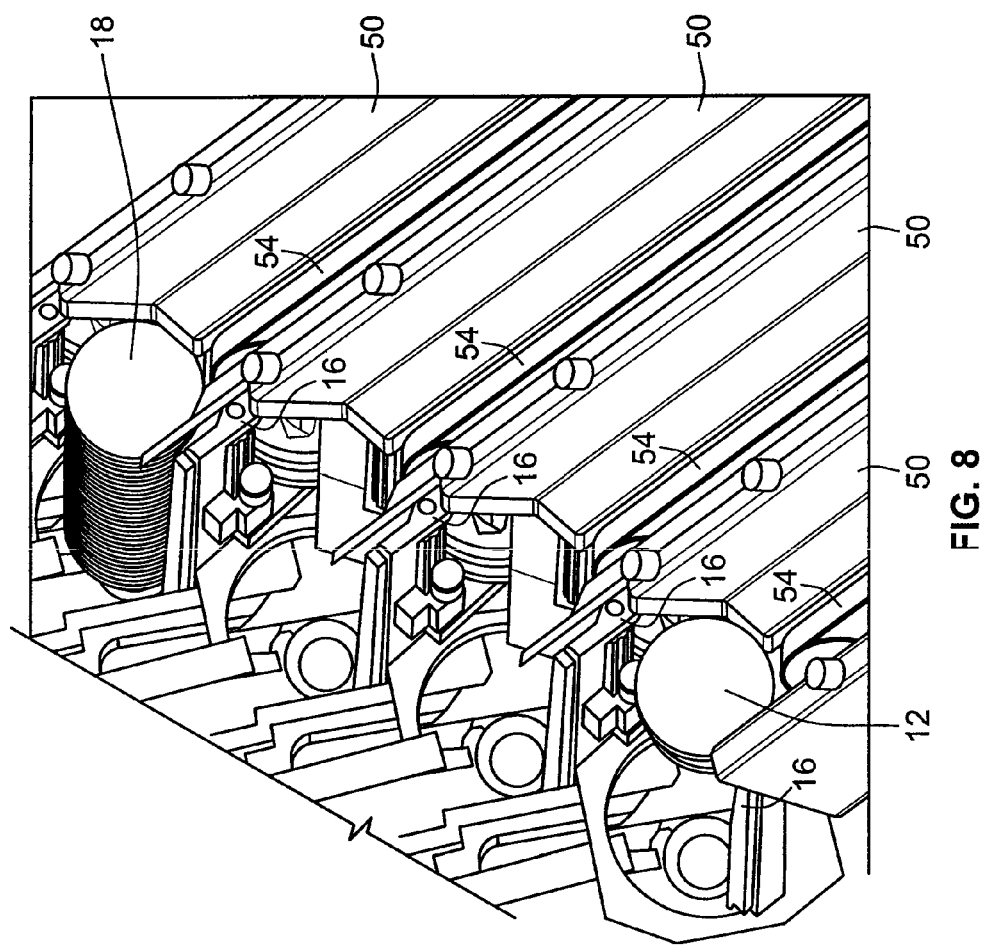
FIG. 8 is another upper perspective view of the intersection of the feed trough and an alignment trough of the system of FIG. 1.
Figure 15:
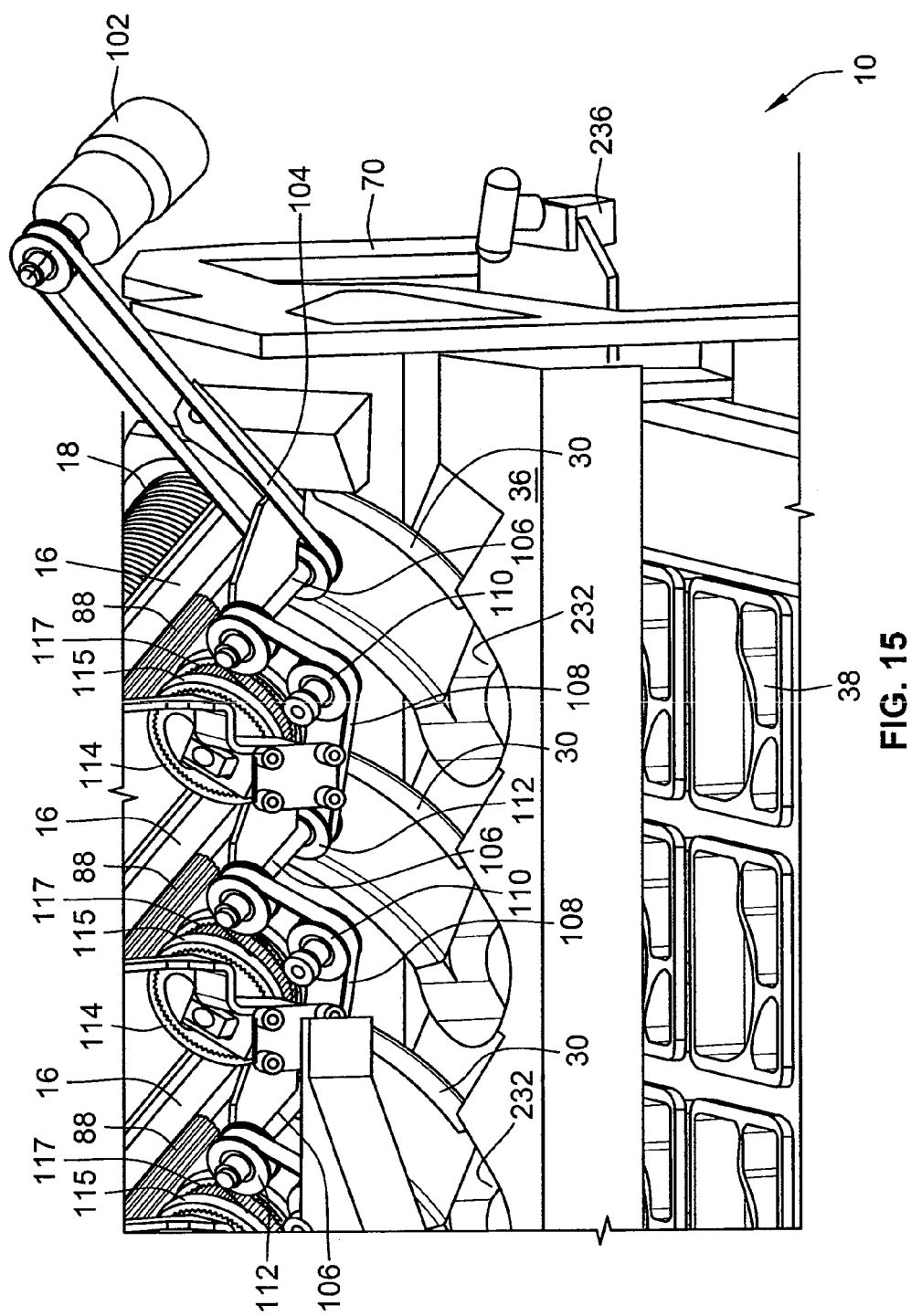
FIG. 15 is a fragmented, front perspective view of slides and a belt system for the alignment trough of the system of FIG. 1 and showing belts partially transparent.

Referring to FIGS. 6 and 15, to rotate the rollers 86 and 88, a roller control motor 102 may be mounted on a side of the support frame 70 to rotate a roller drive belt 104, and may be controlled by controller 42. A casing for the support frame 70 is shown as transparent.

Figure 14:
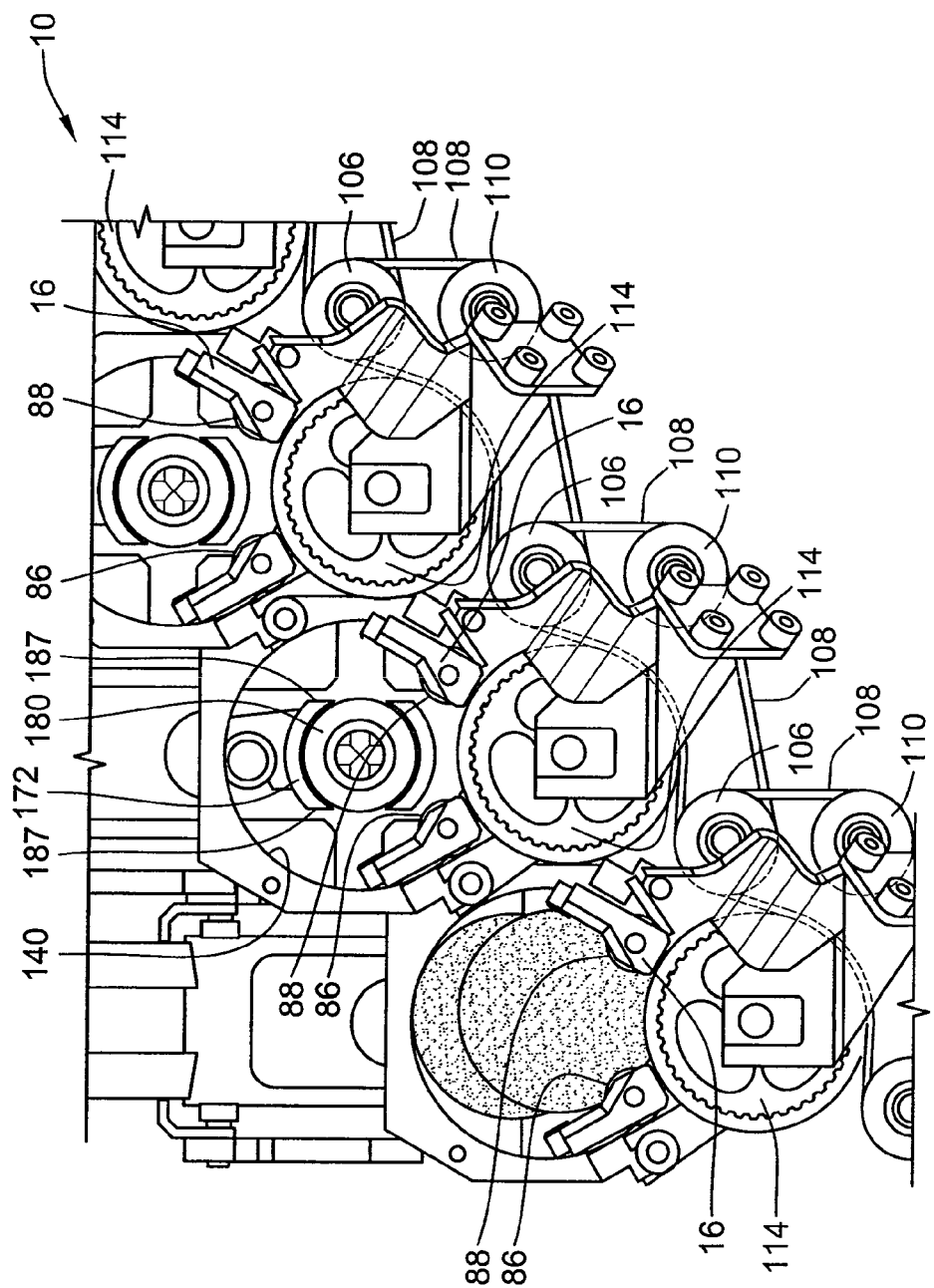
FIG. 14 is an upper elevational view taken at an angle of the alignment troughs for the system of FIG. 1.
Figure 16:
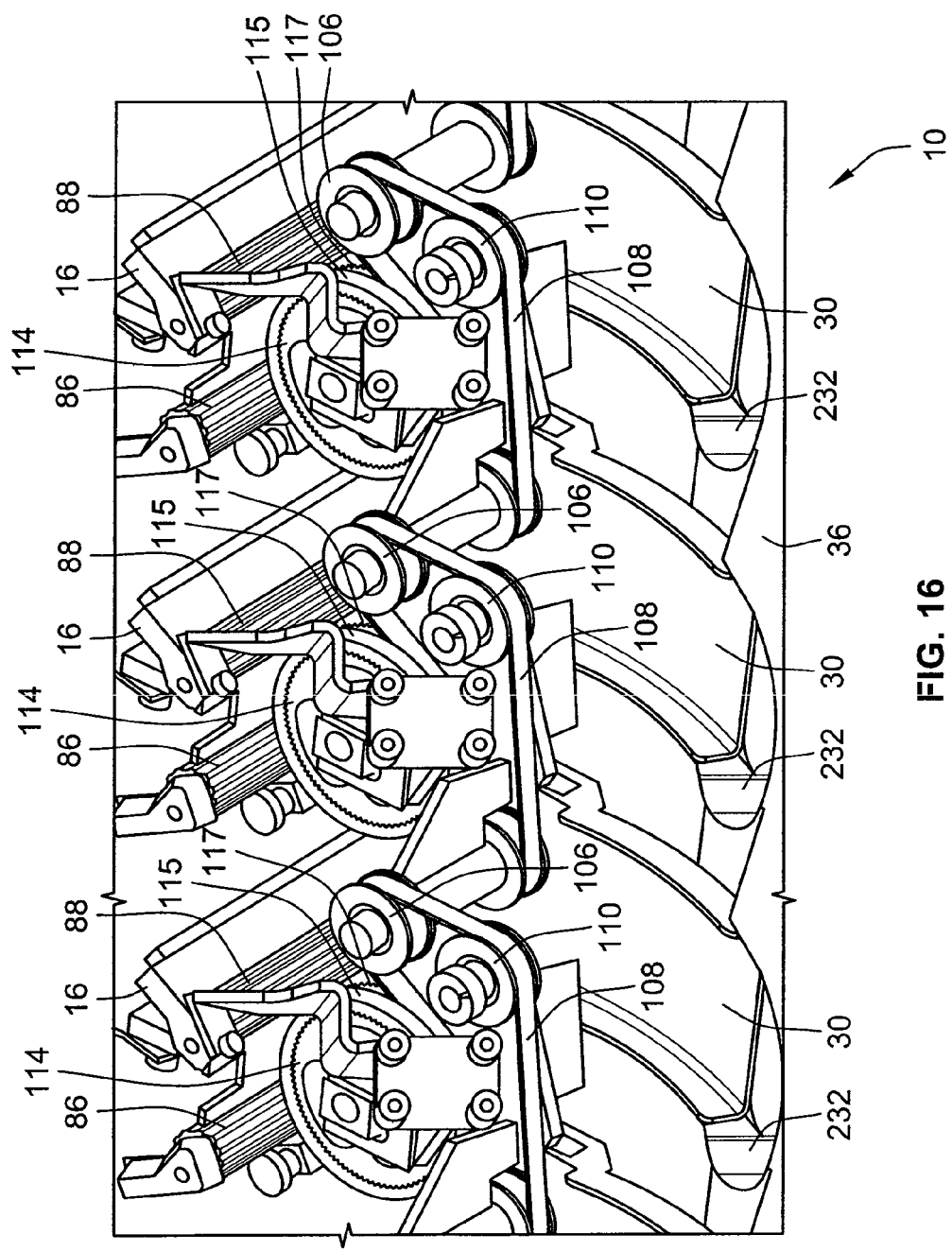
FIG. 16 is a fragmented, upper perspective view of slides, a belt system for the alignment trough, and chutes of the system of FIG. 1.

Referring to FIGS. 14-16, the roller drive belt 104 rotates a rotatable post 106, which in turn, rotates a transfer belt 108. The transfer belt 108 is wrapped around the post 106 and a rotatable post 112 that drives the transfer belt for the next lane 50. The transfer belt 108 also engages a rotatable drive wheel or gear 114 which operably engages the rollers 86 and 88. The drive gear 114 has an outer rim 115 for engaging and rotating the rollers 86 and 88. Specifically, an annular groove 117 radially and interiorly set back from the rim 115 operably engages the transfer belt 108, while the outer surface of rim 15 engages the rollers 86 and 88.

In one alternative, the rim 115 on the drive gear 114 engages the rollers 86 and 88 by friction only so that only when the stack 18 on alignment trough 16 is sufficiently heavy, the rollers 86 and 88 press onto the drive gear 114 with sufficient force to rotate the rollers 86 and 88. Otherwise, the rollers 86 and 88 are positioned to always rotate when the roller motor 102 is on. Thus, the roller motor 102 may simply have its own on/off switch or may be turned on by controller 42.

The groove 117 and/or transfer belt 108 may have teeth or surface treatment to increase the friction between the drive gear 114 and the transfer belt 108. The transfer belt 108 may also be positioned around a tension or positioning wheel 110 to control the tension in the transfer belt 108 and/or to maintain a return section of the transfer belt 108 away from the drive gear 114.

With this configuration, each alignment trough 16 has its own post 106, transfer belt 108, tension wheel 110, and drive gear 114 to rotate the rollers 86 and 88 on the alignment trough 16. Thus, the drive belt 104 and transfer belts 108 are arranged in a chain where the post 106, located on a right side of each lane 50 for example, rotates that lane's transfer belt 108 and drive gear 114 as well as the post 106 on the right side of the adjacent lane 50. This structure rotates the rollers 86 and 88 in the same direction. In order to accommodate this chain and a single drive rotating the belts, the lanes 50 may be different lengths and the alignment troughs 16 may extend at a different angle relative to the lanes 50 to fit the belts among and around the other structure in the system 10 and to angle the gear wheels 114 in order to engage the rollers 86 and 88.

Referring again to FIG. 2, during operation, the sensor 22 is positioned in the vicinity of the alignment trough 16 to detect whether or not food product 12 is present on the alignment trough 16. The sensor 22 may communicate either directly with the conveyor belt motor 62 or controller 42 to activate the conveyor belt 54 to feed the alignment trough 16 when it is low of food products.

Figure 17:
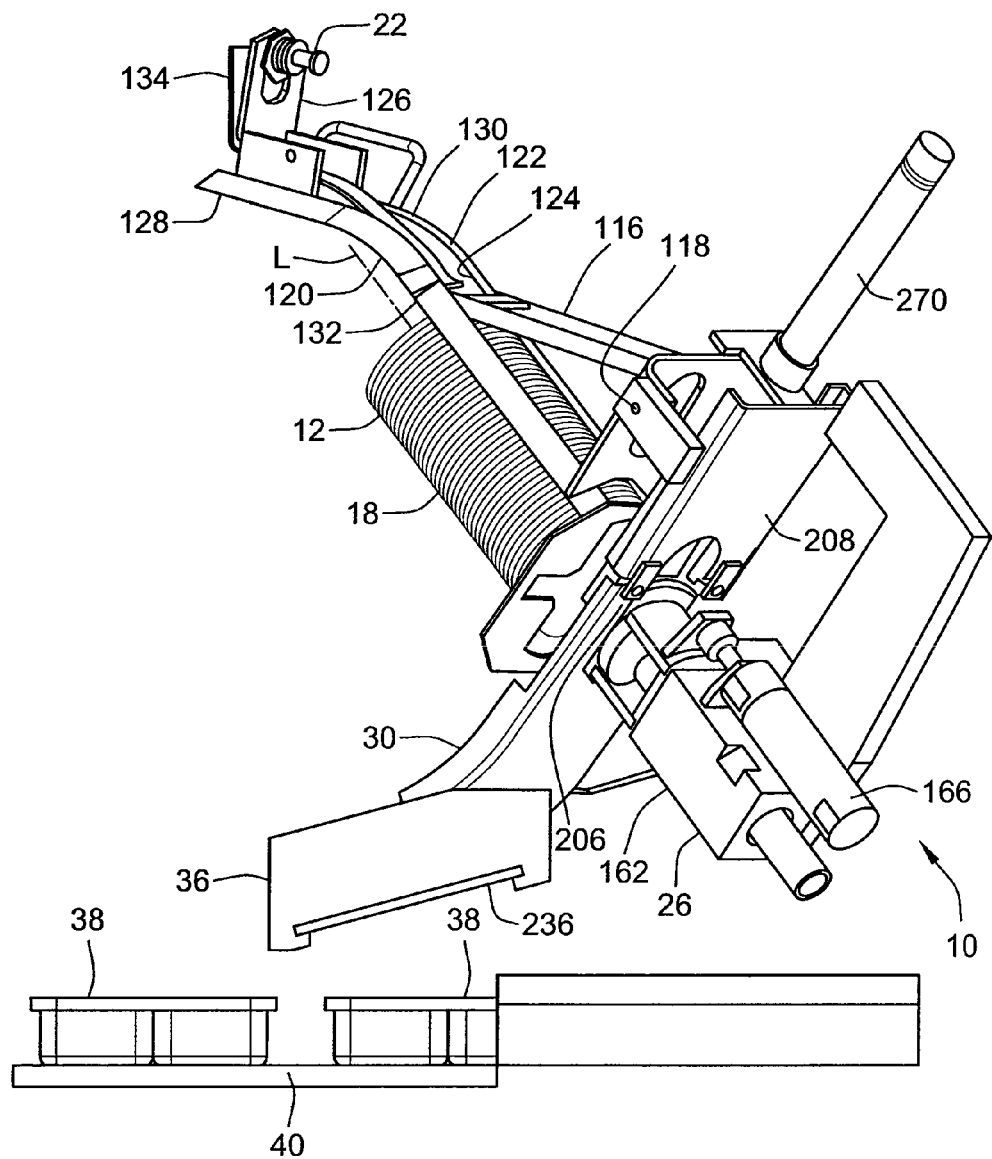
FIG. 17 is a fragmented, side and rear perspective view of the handling portion of the system of FIG. 1 showing a sensor frame in an operable orientation.
Figure 18:
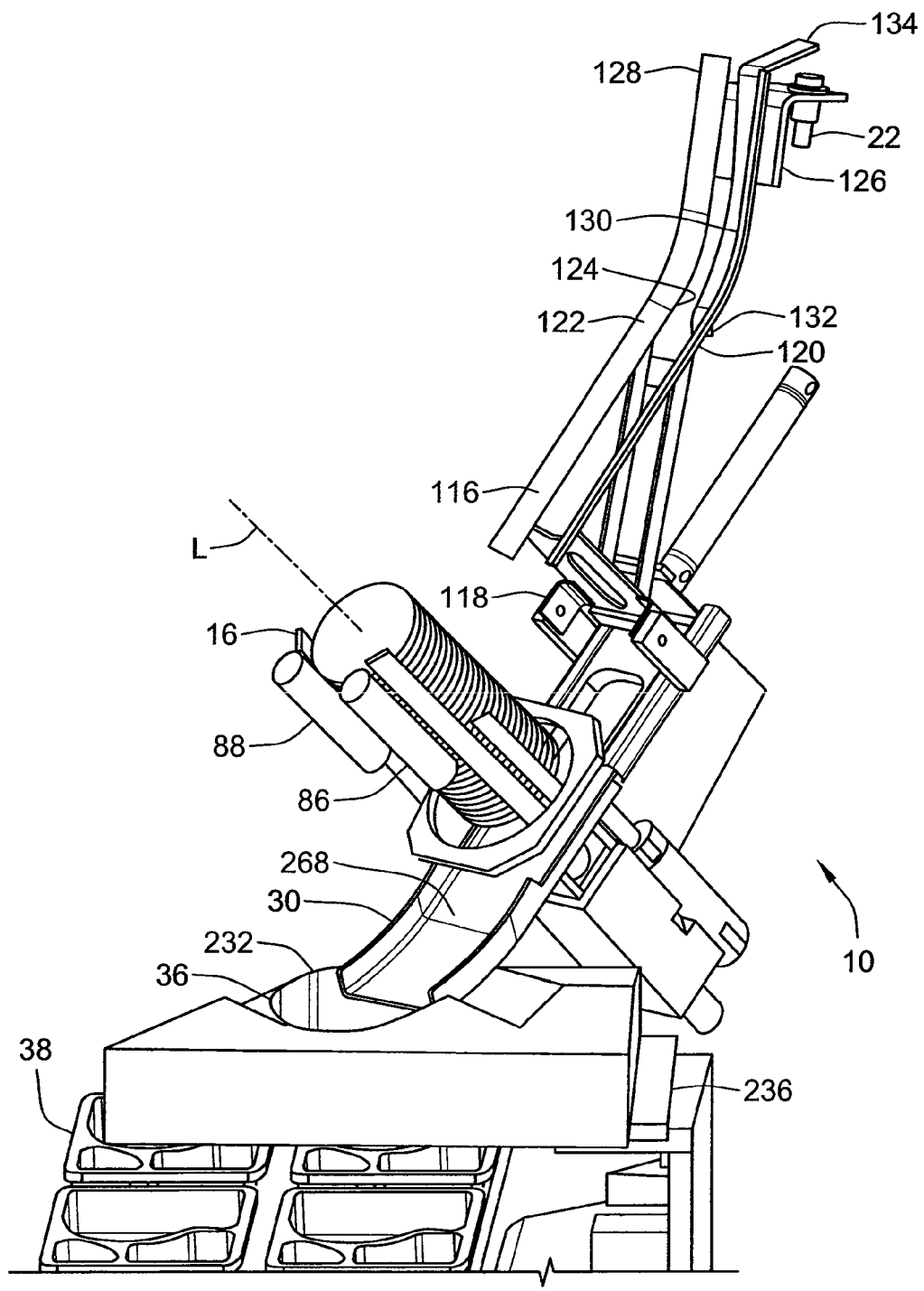
FIG. 18 is a side and front fragmented, perspective view of the handling portion of the system of FIG. 1.
Figure 19:
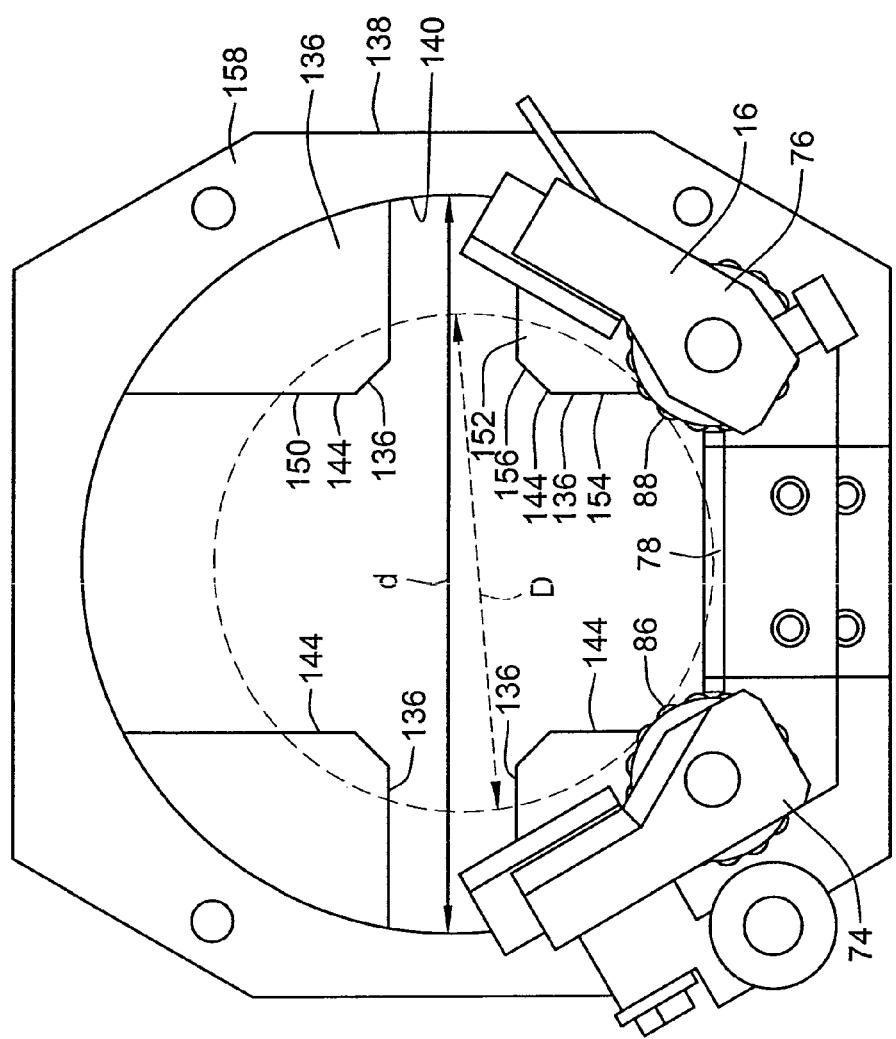
FIG. 19 is an upper plan view of the alignment trough and resilient member frame of the system of FIG. 1.
Figure 20:
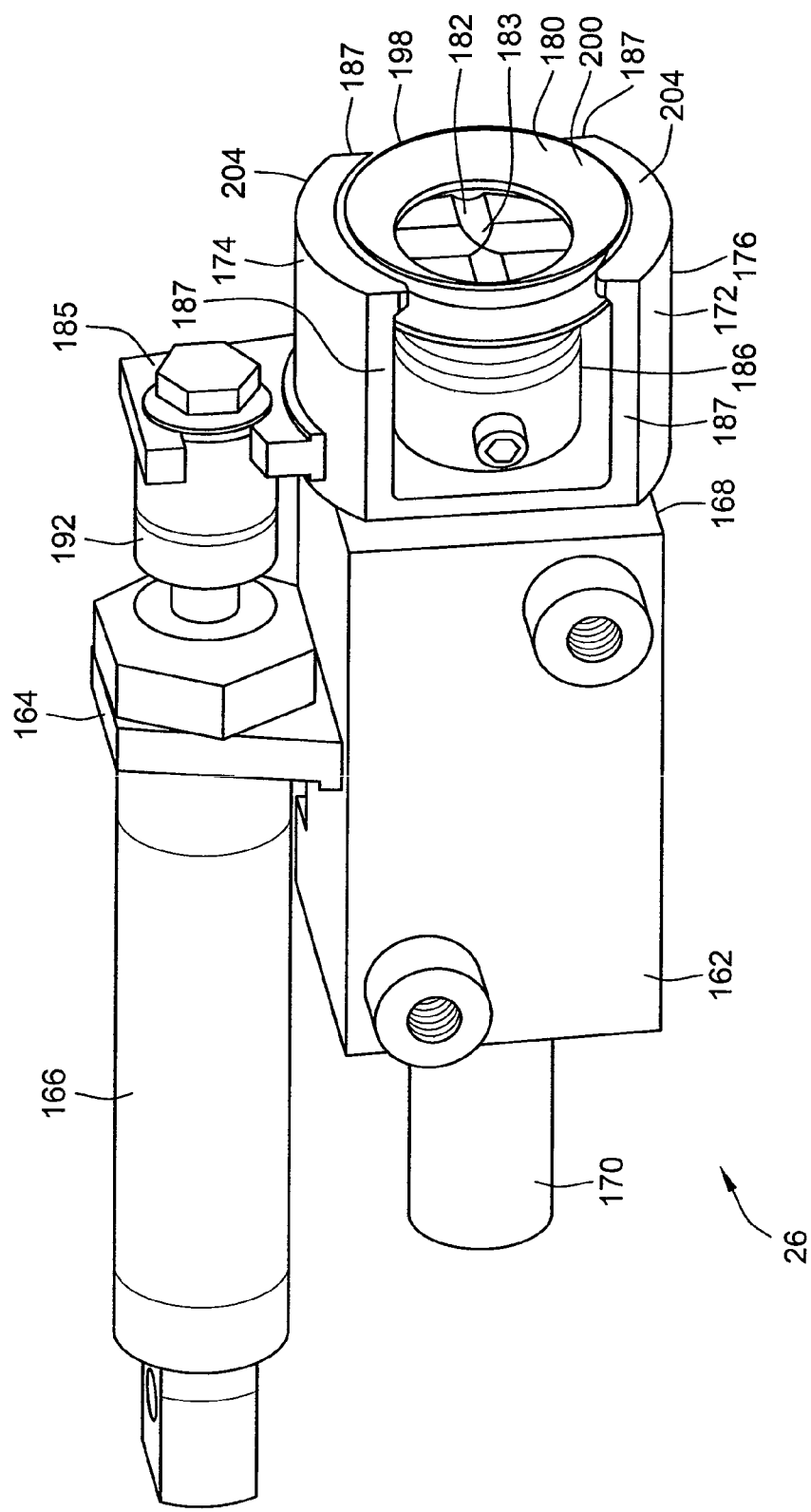
FIG. 20 is a side perspective view of the assembled separation mechanism with a guide block and piston connection of the system of FIG. 1.
Figure 21:
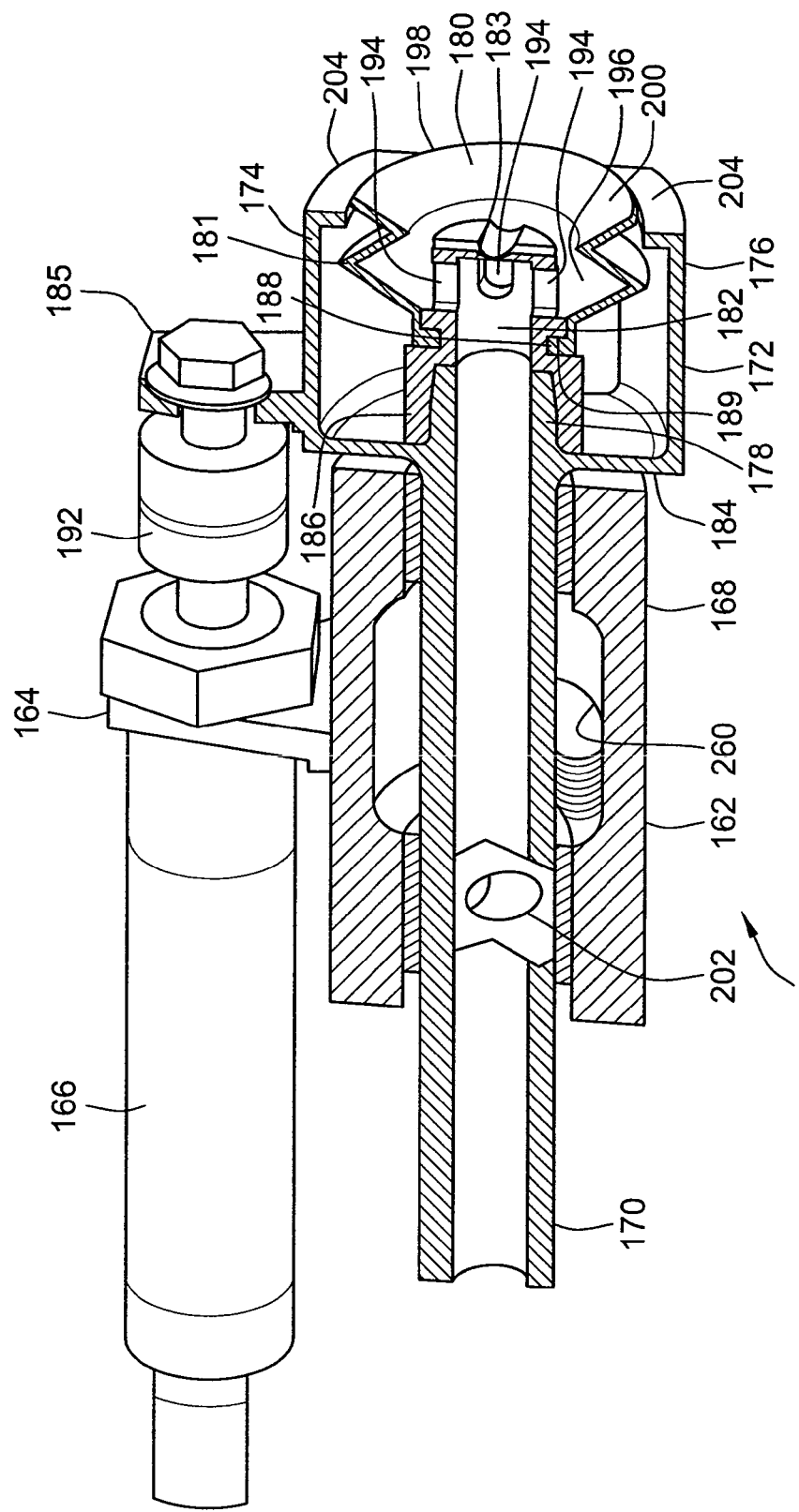
FIG. 21 is a cross-sectional, perspective side view of the assembled separation mechanism of FIG. 20.

Referring to FIGS. 17-18, the sensor 22 is mounted on a sensor frame 116 that is rotatable about a pin 118 and away from the alignment trough 16 as shown by arrow A (FIG. 2) and into a cleaning orientation as shown in FIG. 18 for cleaning the machine 10. The frame 16 has two generally parallel main members 120 and 122 that are curved to extend above and along the stack 18 on the alignment trough 16 and above the food products 12 at the handling end portion 68 of the feed trough 14. The curvature of the main members 120 and 122 may also assist to maintain the food products 12 in alignment.

A gap 124 is formed between the main members 120 and 122, and a bracket 126 spans the gap 124 at a distal end portion 128 of the frame 116. In the operating position as shown in FIGS. 2 and 17, the bracket 126 holds the sensor 22 and also pivotally holds a biased activation lever arm 130. The lever arm 130 can be biased by a biasing device, such as a coil or leaf spring at the bracket 126 for example, to bias a proximal end 132 of the lever arm 130 through gap 124. This causes the proximal end 132 to engage with the food products 18 as the food products move along the alignment trough 16 as shown by arrow B (FIG. 2). As each food product hits the lever arm 130, the lever arm 130 pivots, and a distal end 134 of the lever arm moves up and down in front of sensor 22 to indicate the presence and absence of a food product 12 as shown by arrow C (FIG. 2). The sensor 22 then sends a signal to the controller 42 or the conveyor belt motor 62 to activate the rollers 86 and 88.

Referring to FIGS. 10-13 and 19, the handling apparatus 10 also has at least one movable member 28, as mentioned above, extending into the passage 80 to control the separation of the bottom food product 24 from the remainder of the stack 18. In one example form, the at least one movable member 28 comprises a resilient member 136.

The resilient member 136 is positioned within a generally flat gate or frame 138 in the proximity of the alignment trough 16, and more specifically, at the lower end portion 84 of the alignment trough 16 or other place along the alignment trough 16 as long as the frame 138 is below the stack 18 and the bottom food product 24. The frame 138 defines an opening 140 through which the food product 12 passes along passage 80 and longitudinal direction L. The at least one resilient member 136 has one portion 142 connected to the frame 138 and a free end portion 144 extending to cover a portion of the opening 140.

In the illustrated form, the opening 140 is circular and has a diameter d (FIG. 19) that is sufficiently large to permit a range of sizes of food products through opening 140. In one example, the opening 140 is about 4.25 inches to accommodate food products 12 with a diameter D of about 3.0 to 3.4 inches. In the illustrated form, a single sheet 148 of resilient material has a central cut-out 150 in the shape of a cross (although many other shapes are contemplated) to form a plurality of resilient members 136 that extend to cover a different portion of the opening 140. Here, each resilient member 136 has two perpendicular sides 152 and 154 forming the cross-shape and a beveled corner 156 between the two sides 152 and 154 and facing the center of opening 140. The single sheet 148 is fastened between a front panel 158 and a back panel 160 forming the frame 138.

It will be appreciated that the resilient members 136 may be provided in separate pieces, and more or less than four resilient members 136 may be used, as long as the movement of the food products 12 is properly controlled. Also, while the frame 138 completely encloses the opening 140, other configurations are possible where, for example, the frame 138 merely extends on one or more sides of a generally defined space for the food products to travel through as long as the resilient member 136 can be placed under the food products 12 to control their motion.

In the illustrated form, the resilient member 136 is sufficiently resistant to deformation to prevent the bottom food product 24 from passing the at least one resilient member 136, and through frame 138, due to the weight of the stack 18 alone. However, the resilient member 136 also is capable of elastic deformation to deform substantially elastically to a sufficient degree to permit the bottom food product 24 to pass the resilient member 136, and through the frame 138, when an external force other than the weight of the stack 18 is applied to the bottom food product 24. In one form, the resilient member 136 is a flexible piece of rubber or plastic, such as a 1/16 inch thick piece of urethane, as one example. With the proper material and dimensions described, the resilient member 136 has sufficient resiliency to permit only a specified number of food products to pass at a time. In one example, the resilient member 136 only permits one food product 24 to pass at a time.

More specifically, the separation device 26 pulls the bottom food product 24 longitudinally away from stack 18 and onto or toward the resilient member 136. As the separation device 26 then pulls the food product 24 through the openings 140 and 150, the free end portions 144 of the resilient members 136 flex or deform downward and away from the center of opening 140 as the food product 24 bends inward, effectively reducing its outer diameter from the predetermined maximum diameter D. The bending of the food product 24 to a reduced diameter may permit the food product 124 to pass the resilient members 136 with less flexing of the resilient members. This may permit the resilient members 136 to have increased resistance to deformation to hold the remainder of the stack 18. Thus, once the single bottom food product 24 passes the resilient members 136, the resilient members 136 snap back to their original, generally flat orientation in time to hold the remainder of the stack 18.

Referring to FIGS. 20-23, in the illustrated example the separation device 26 reciprocates: it advances to temporarily fix the bottom food product 24 to the separation device, and retracts to pull the bottom food product 24 from a remainder of the stack 18 and to place the food product 24 level with the slide 30. In one form, the separation device 26 is temporarily fixed to the bottom food product 24 by a partial vacuum or negative pressure.

In more detail, the separation device 26 includes a housing or guide block 162 that has a flange 164 for securing a piston cylinder 166 to the guide block 162. The guide block 162 is mounted on the support frame 70 at an orientation so that a front end portion 168 of the guide block 162 faces the frame 138 and movable member 28. A hollow shaft 170 extends through the guide block 162 and has an end portion 172 that forms at least one wall but here two curved stabilizing walls 174 and 176 that are spaced circumferentially from each other. A tubular core 178 and the stabilizing walls 174 and 176 extend longitudinally and distally from a bottom wall 184 that extends outwardly and radially from the shaft 170. The core 178 is interiorly spaced from the stabilizing walls 174 and 176.

A cup 180 is mounted on the core 178 interiorly and concentrically to the stabilizing walls 174 and 176. A nozzle 182 is also mounted on the core 178 and within the cup 180. In the illustrated form, the nozzle 182 has a cylindrical base 186 that covers the core 178, and the cup 180 has a proximal, annular rib 188 received by an annular groove 189 on the nozzle 182 so that the cup 180 is mounted on the nozzle 182. The nozzle 182 may be fixed to the core 178 by friction fit, adhesive, welding, fasteners, and the like. The nozzle 182 may also have an upper surface 183 with a design to prevent the food product from sticking to the nozzle such as with an indented 'X'.

A flange 185 extends from the exterior of one of the sidewalls 174 or 176 to be fixed to a reciprocating piston rod 192 extending from the fixed piston cylinder 166. With this structure, activation of the piston cylinder 166 causes the piston rod 192 to move forward a predetermined set distance, which translates the shaft 170 forward through the guide block 162. The advancement of the shaft 170 advances the stabilizing walls 174 and 176, core 178, nozzle 182 and cup 180 toward the movable member 28 until the stabilizing walls 174 and 176 and the cup 180 extend at, or slightly through, the movable member 28 and engage the bottom food product 24 on the alignment trough 16. In one form, the stabilizing walls 174 and 176 and the bottom wall 184 have cut-off straight sides 187 so that the front end view (FIG. 23) of the front end portion 172 is generally rectangular or obround. This shape permits the front end portion to fit within the cross-shaped opening 150 defined by the resilient member 136 as well as a groove 210 on slide 30 described in more detail below.

In order to temporarily fix the cup 180 to the bottom food product 24 by partial vacuum, the hollow shaft 170 is fluidly connected to a vacuum device (such as a pump) 190 (FIG. 3). Specifically, the guide block 162 has a vacuum inlet 260 fluidly connected to the vacuum device 190. The inlet 260 opens to an interior chamber 262 on the guide block 162. Holes 202 on the shaft 170 provide partial vacuum to nozzle 182 and within cup 180 only when the holes 202 of the shaft 170 are within the chamber 262. With this structure then, the cup 180 only obtains partial pressure as the shaft 170 axially advances and retracts the holes 202 through chamber 262. Once the holes 202 are retracted passed the chamber 262 in the guide block 162, the partial vacuum pressure is cut off to the holes 202, and in turn, the cup 180.

The nozzle 182 has at least one orifice 194 that opens to the interior 196 of the cup 180. Air is suctioned from the interior 196 of the cup 180, through nozzle 182 and the shaft 170 to the vacuum device 190 to reduce the pressure in the cup 180 when the cup 180 is approaching, engaging, or retracting with the bottom food product 24. Here, four obround orifices 194 face radially outward in four different lateral directions from the nozzle 182 in the interior 196 of the cup 180 so that the partial vacuum or suction first reduces pressure in the cup 180 in a lateral direction. The suction through a main opening 198 defined at the upper rim 200 of the cup 180 is therefore indirect and weakened so that the food product 24 is not impacted by the direct suction that could damage the food product. The vacuum device 190 provides pressure at 29 mmHg while the pressure at the rim 200 impacting the food product 24 is reduced to about 5-6 mmHg.

It will be appreciated that alternatively the orifices 194 may be placed on a sidewall forming a portion of the cup 180 and face radially inward, for instance, instead of being on the core 178 and facing radially outward. In one form, the orifices 194 may be positioned anywhere in the interior of the cup 180 as long as the full force of the partial vacuum does not impact the food products.

The controller 42 may reciprocate the piston 166 of the separation device 26 while the vacuum device 190 remains on. Otherwise, the controller 42 may also control the vacuum device 190 to coordinate the operation of the two so that the vacuum may be on only as needed. Alternatively, the piston 166 and vacuum device 190 could operate on its own shared control or the piston 166 may have a separate control that coordinates largely by sensors.

Figure 22:
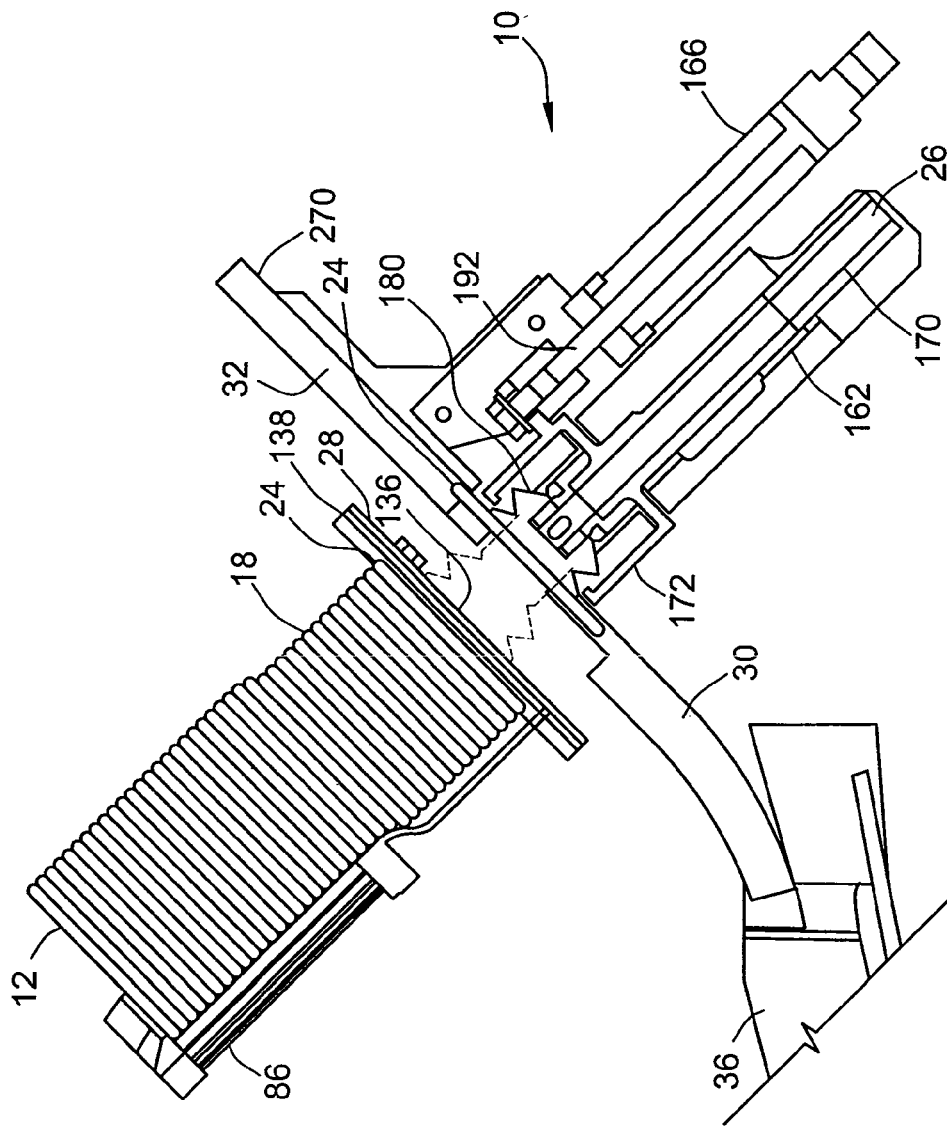
FIG. 22 is a side cross-sectional view of the handling portion of the system of FIG. 1.
Figure 23:
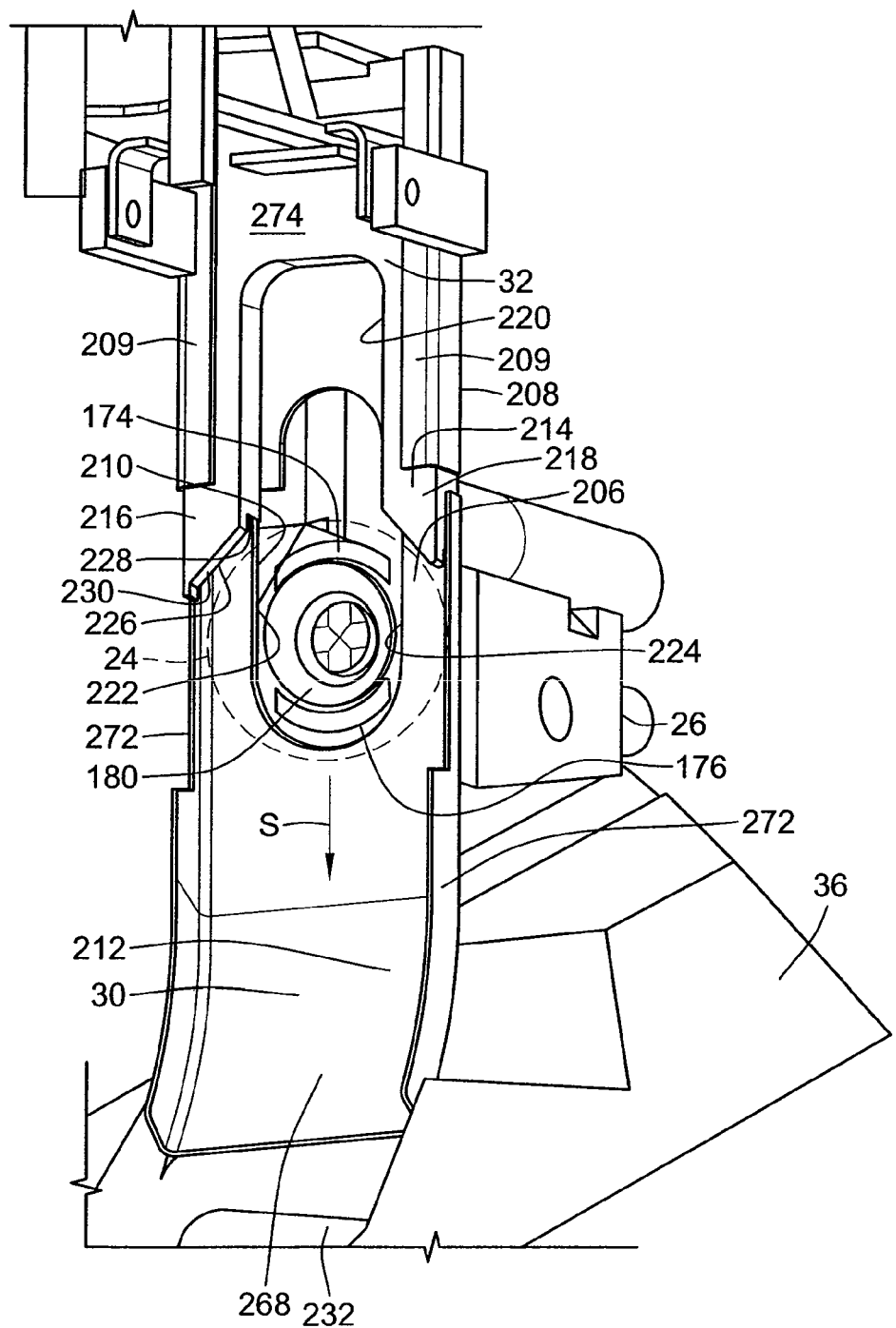
FIG. 23 is a fragmented, front perspective view of a driver and slide of the system of FIG. 1.
Figure 24:
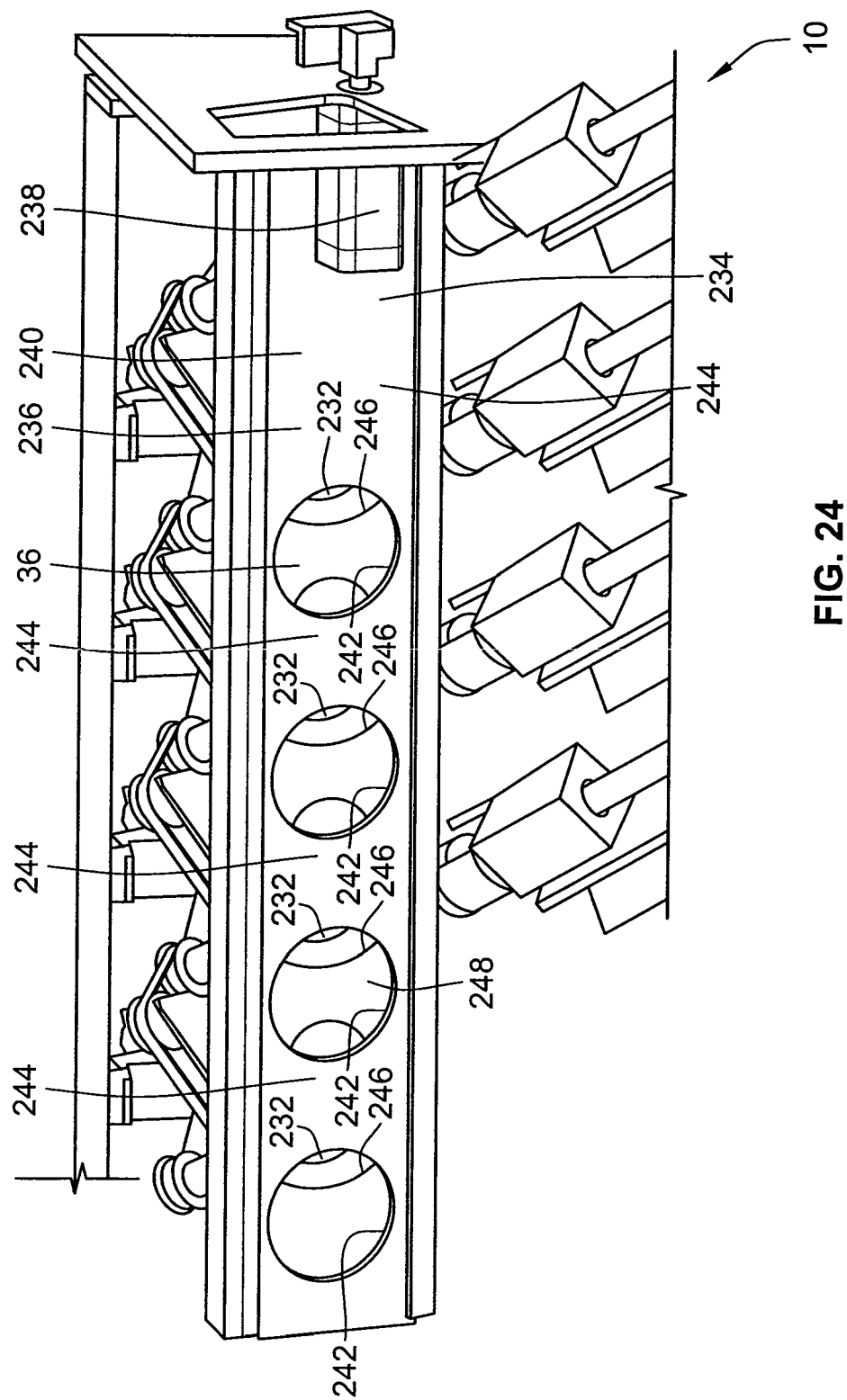
FIG. 24 is bottom perspective view of a gate for chutes of the system of FIG. 1.
Figure 25:
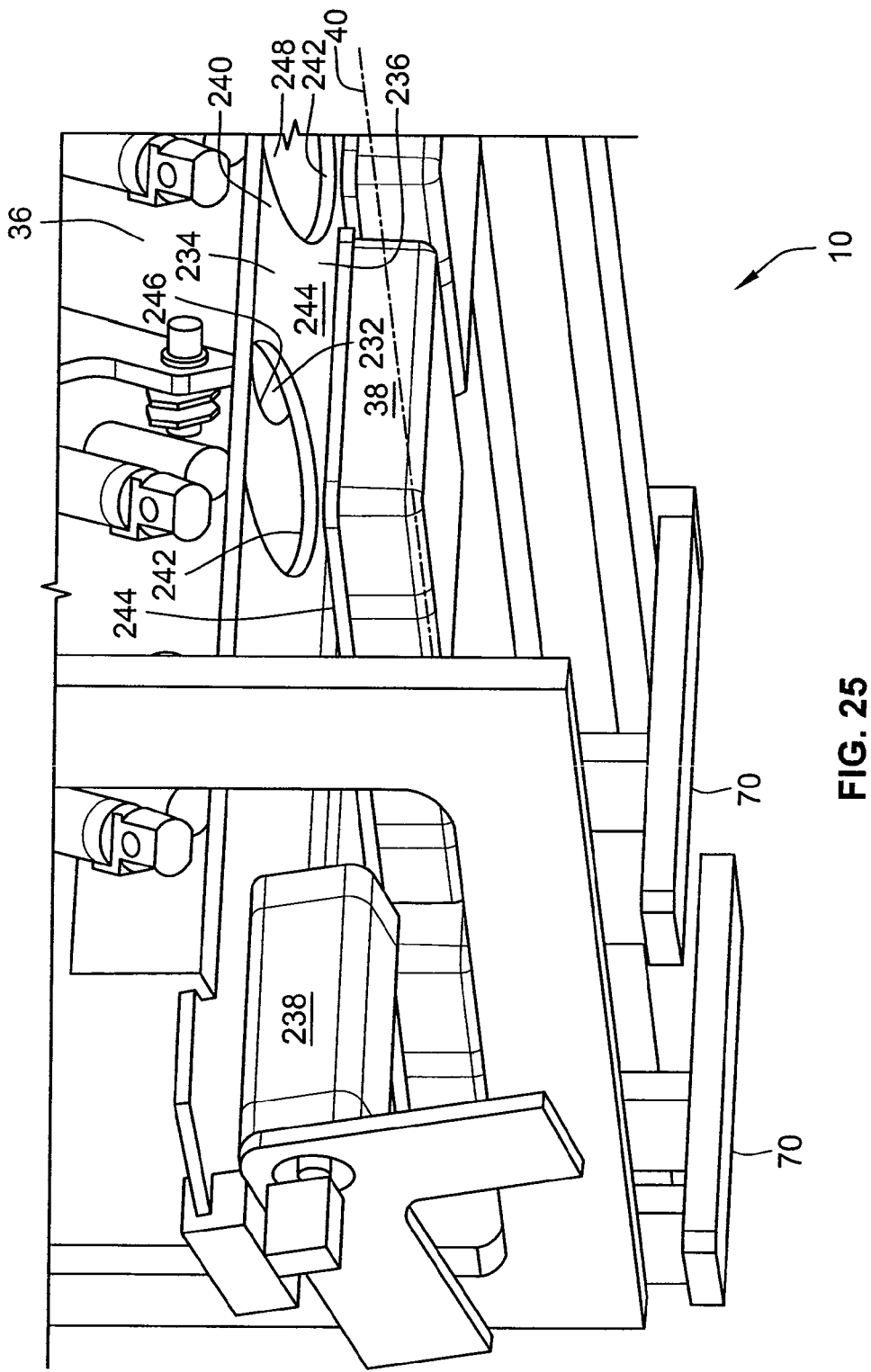
FIG. 25 is side perspective view of the chute, gate, and packages on a conveyor belt of the system of FIG. 1.

Referring to FIGS. 22-23, in operation, the piston 166 is set to advance the shaft 170 a predetermined, fixed distance so that the rim 200 of the cup 180 engages the bottom food product 24 (as shown in dashed line on FIG. 22) through frame 138. In the illustrated form, the vacuum is applied as the cup 180 advances and before the rim 200 engages the bottom food product 24 to pull the food product onto the rim 200. The cup 180 extends slightly above upper surfaces 204 of the stabilizing walls 174 and 176 to engage the food product 24 first. In one form, the cup 180 may be made of plastic and have one or more bellows 201 so that the cup 180 may slightly compress on one or more sides to more completely conform to the shape of a non-symmetrical bottom food product 24 as the cup 180 engages the bottom food product.

Since the cup 180 has a smaller diameter than the food product 24, a central portion of the food product 24 will be pulled toward the cup 180 before its outer rim, urging the food product to curve. The rim 200 also is curved and concave so that the food product 24 is further urged into a curved bowl shape as it is pulled onto the rim 200 until it engages and corresponds to the shape of the rim 200. The food product also then engages the upper surfaces 204 of the stabilizing walls 174 and 176 which provide more surface area to hold the food product steady on the cup 180 since the stabilizing walls 174 and 176 have a wider outer diameter than the cup 180. The shaft 170 and the front end portion 172 with cup 180 then retract, pulling the food product 24 with it.

As the now bowl shaped food product engages the resilient member 136 and moves downward through frame 138, the free end portions 144 of the resilient member(s) 136 flexes downward to provide clearance for the food product 24 to pass. As mentioned above, this may be assisted by the reduced outer diameter of the food product 24 so that the resilient member 36 need not flex to the extent needed for the full diameter of the food product. Once the food product is retracted passed the resilient member 136 and through the frame 138, the free end portions 144 of the resilient member 136 shift back to their natural, more flat positions before the remainder of the stack 18 can drop or advance past the resilient member 136. The resilient member 136 then holds the remainder of the stack 18 until the cup 180 engages the next bottom food product 24.

Once cleared of the frame 138, the front end portion 172 of shaft 170, and the food product 24 it is holding, is retracted until the food product is level with slide 30. As mentioned above, the slide 30 has a groove 210 shaped to provide clearance for the front end portion 172 to move up and down passed the slide 30. In one form, while the groove 210 is wider than the front end portion 172 of the shaft 170, the food products 24 are wider than the groove 210 so that the slide 30 retains the food product 24 while the front end portion continues to retract below the slide 30. As the food product 24 approaches or engages the slide 30, the holes 202 on shaft 170 retract passed the chamber 262 and the vacuum is shut off, releasing the food product 24 from the cup 180. The food product then lays upon slide 30 detached from the separation device 26 and ready to be pushed down the chute 30 by the driver 32. Once the driver 32 moves the food product out of the path of the separation device 26, the cup 180 can be advanced again.

Referring again to FIGS. 17-18 and 23, an upper portion 206 of slide 30 is connected to a frame support 208 which in turn is supported by frame 70. The frame support 208 also supports the driver 32. The upper portion 206 of the slide 30 is generally planar and is sloped at an angle or direction generally perpendicular to the longitudinal direction L defined by the alignment trough 16. In one form, the slide extends 45 degrees from horizontal and 90 degrees from longitudinal axis L. The upper portion 206 also defines the groove 210 mentioned above to provide clearance for the front end portion 172 of the separation device 26. In one form, the groove 210 may be generally U-shaped or any other shape that retains the food product 24 as the separation device 26 passes.

A lower portion 212 of the slide 30 rests on the chute 36 and is slightly curved to change the orientation of the food products 24. Thus, the lower portion 212 drops the food products into the chute 36 while the generally flat sides 46 of the food products 12 extend generally horizontal. The upper surface 268 on the slide 30 that receives the food product 12 may be serrated or may have protrusion patterns so that the food products 12 do not stick to the slide.

Referring to FIGS. 2, 18, and 23, to initially move the food product 24 down the slide 30 from the vicinity of the groove 210 and toward chute 36, the driver 32 extends and reciprocates on frame support 208 and parallel to a second direction (shown by arrow S) defined by the upper end portion 206 of the slide 30. Direction S is the initial direction of motion for the food product 24 sitting on the slide 30. The frame support 208 may have curled in edges 209 to extend above the driver 32 to maintain the driver along direction S. The driver 32 may also be connected to, and be driven by, a piston 270 that may be controlled by controller 42.

The driver 32 includes an engagement end portion 214 for engaging the food product 24 sitting on the slide 30. In one form, the engagement end portion 214 has two prongs 216 and 218 extending forward from a main portion 274 and defining a gap 220 therebetween. The gap 220 either aligns with, or is wider than, a width of the groove 210 so that the two prongs 216 and 218 translate axially off to the sides 222 and 224 of the groove 210. This ensures that the driver 32 does not block the groove 210 and interfere with the operation of the separation device 26. In one form, the driver 32 has an outer width corresponding to the width of the slide 30, and the slide 30 may have upturned side walls 272 to maintain the prongs 216 and 218 on the slide 30 while the prongs reciprocate. The walls 272 also prevent the food product 24 from sliding off of the slide 30.

At least one of the prongs 216 and 218 has a distal front end 226 with a notch 228 for receiving the food product 24. The notch 228 is set back from a forwardly extending overhang 230 that is placed over the food product 24 as the driver engages the food product and thrusts it forward to resist forces that may cause the food product 24 to lift up from the slide 30. The distal front end or ends 226 may also be concavely curved to generally match the curvature of the thin edges 44 of the food products 12.

The reciprocation of the driver 32 is timed to advance to engage the food product 24 and push the food product down the slide 30 each time the separation device 26 moves a food product 24 onto the slide 30 from the alignment trough 16.

It will be appreciated that instead of a forward thrusting fork or prongs, the driver 32 may use other devices that either push or pull the food product down the slide. Such devices may run along the slide and use friction or a conveyor belt, for example. The slide 30 may also be sufficiently steep so that gravity alone is sufficient to move the food product 12 down the slide.

While the operation for one lane 50 has thus far been described, it will be understood that the same operation and structure may be applied similarly to all of the lanes 50.

Thus, in the illustrated form, the handling system 10 changes the orientation of the food products 12 a full 90 degrees from an upright or vertical orientation for easy loading of the feed trough 14 to a flat horizontal orientation convenient for loading the food products onto packages 38 on a conveyor belt 40 that hold a vertical pile of the food products 12. The alignment trough 16 forms the stack 18 piled in a first direction or longitudinal direction L. Holding the stack 18 at an incline causes the generally flat face 46 of each food product 12 in the stack to be inclined to generally face downward. The single bottom food product 24 is then isolated from the stack 18 in the first direction. The single food product 24 is then moved in the second direction S different from the first direction L to move the single food product to a collection point 34 or chute 36 while changing the orientation of the food product 24 so that the flat face 46 of each food product 24 lies generally horizontally.

Referring to FIGS. 15, 18 and 24-25, the chute 36 forms a chamber 232 at the bottom of each slide 30 for receiving the food products 12 from the slide. The chamber 232 has a diameter larger than the largest possible diameter of the food product 12. A bottom 234 of the chamber 232 is formed by an intermittently opening door or gate 236. The gate 236 is open by a reciprocating device such as a piston 238 which may be controlled by control 42, other controllers, or may have its own controller to be moved by specified timing or according to sensors. In one form, the gate 236 is part of an elongate member 240, such as a plastic or metal plate, with an array of holes 242 sufficiently large to permit the food products 12 to drop through them. The holes 242 are spaced apart along the length of the elongate member 240 by solid portions 244 that have sufficient area to cover a bottom opening 246 of each chamber 232. The reciprocating device 238 slides the elongate member 240 back and forth on a bottom 248 of the chute 36 to cover and uncover the bottom openings 246 of all of the chambers 232. It will be understood, however, that each chamber 232 may be formed by a separate chute 36, and the bottom 246 of each chamber 232 may be opened or closed with a separate gate.

The process described above from the isolation of a food product 24 from the alignment trough 16 to placement of the food product 24 into the chute 36 is repeated until a specified number of food products are placed in one or more of the chambers 232. Once the specified number of food products 12 is placed in the chambers 232, and in one form aligned in a vertical pile or group, the gates 236 are open to permit the pile to drop the specified number of food products from the chute 36 together. The chambers 232 are positioned over one or more of the conveyor belts 40 that convey the packages 38 to receive the food products 12. The packages 38 may be positioned directly under the chambers 36 to receive the vertical pile of the specified number of food products 12.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. An apparatus for handling pliable food products each having a thin edge and a generally flat face, the apparatus comprising:
    a feed trough configured to hold the food products upright on their thin edges so that the flat faces of the food products generally extend vertically, the feed trough including a conveyor belt configured to support the food products thereon and having a driving end and a handling end opposite the driving end, the driving end of the feed trough configured to rotate the conveyor belt of the feed trough toward the handling end of the feed trough to transport the food products in the feed trough toward the handling end of the feed trough;
    an alignment trough positioned adjacent the handling end of the feed trough and including an upper portion located below the handling end of the feed trough and configured to receive the food products that fall from the conveyor belt at the handling end of the feed trough, the alignment trough being inclined relative to a horizontal axis to hold a stack of the food products at an incline relative to the horizontal axis so that the generally flat face of each food product in the stack, when positioned in the alignment trough, is inclined to generally face downward;
    a slide configured to receive the food products from the alignment trough and to direct the food products to an orientation where the flat face of the food products generally extend horizontally; and
    a chute with an intermittently open bottom for collecting a specified number of the food products from the slide and dropping the specified number of food products from the chute together.

2. The apparatus of claim 1, wherein the feed trough includes at least one elongate channel having side walls configured to contact the thin edges of the food products such that the flat faces of the food products face in a direction of movement of the food products along the at least one elongate channel.

3. The apparatus of claim 2, wherein the at least one elongate channel is operatively connected to at least one conveyor belt operatively connected at a driving end of the feed trough to at least one wheel operatively connected to a drive shaft of a conveyor belt motor to facilitate movement of the food products along the at least one elongate channel.

4. The apparatus of claim 1, wherein the at least one elongate channel is inclined relative to the horizontal axis such that the food products move generally upwards along the at least one elongate channel toward the alignment trough.

5. The apparatus of claim 1, wherein the alignment trough includes two side walls and a middle wall between the two side walls, the middle wall including a groove to provide clearance for a conveyor belt.

6. The apparatus of claim 1, wherein the alignment trough generally defines a longitudinal axis and includes two side walls and a middle wall between the two side walls, the middle wall and the side walls slidingly engaging the thin edges of the food products in the stack.

7. The apparatus of claim 6, wherein the alignment trough is inclined relative to the horizontal axis and wherein the longitudinal axis defined by the alignment trough is not parallel relative to a vertical axis perpendicular to the horizontal axis.

8. The apparatus of claim 6, wherein the flat face of each of the food products in the stack of the food products in the alignment trough is inclined relative to the horizontal axis, perpendicular to the longitudinal axis defined by the alignment trough, and not perpendicular to a vertical axis perpendicular to the horizontal axis.

9. The apparatus of claim 1, wherein the feed trough and the alignment trough are inclined at different angles relative to the horizontal axis, and wherein the flat faces of the food products in the feed trough and the flat faces of the food products in the alignment trough are at different angles relative to each other and relative to the horizontal axis.

10. The apparatus of claim 1, wherein the alignment trough is inclined relative to the horizontal axis at an angle greater than the feed trough.

11. The apparatus of claim 10, wherein the feed trough is inclined relative to the horizontal axis at an angle of about 20 degrees and the alignment trough is inclined relative to the horizontal axis at an angle of about 45 degrees.

12. The apparatus of claim 10, wherein the alignment trough includes an alignment mechanism configured to apply a lateral force on the food products to maintain the food products in the stack, the alignment mechanism comprising at least two rollers including a plurality of edges disposed to engage side edges of the food products and impart a lateral force on the side edges of the food products to rotate the food products in the alignment trough.

13. The apparatus of claim 12, wherein each of the at least two rollers has an axis of rotation generally parallel to the longitudinal axis defined by the alignment trough and is mounted between at least one of the two sidewalls and the middle wall of the alignment trough.

14. The apparatus of claim 12 wherein the alignment trough has an upper half and wherein the at least two rollers extend only along the upper half.

15. The apparatus of claim 12 wherein the at least two rollers rotate in the same direction.

16. The apparatus of claim 12, further comprising a roller control motor configured to rotate the at least one rollers, the roller control motor being configured to be in communication with a controller.

17. The apparatus of claim 1, further comprising a sensor positioned above the alignment trough, the sensor being configured to activate a conveyor belt on the feed trough when an amount of the food products lower than a predetermined amount is detected in the alignment trough.

18. The apparatus of claim 1, further comprising a reciprocating separation device disposed and configured to advance to temporarily fix a bottom food product in the stack of the food products in the alignment trough to the separation device, and retract to pull the bottom food product from a remainder of the stack, and wherein the separation device is temporarily fixed to the bottom food product by a partial vacuum.

19. The apparatus of claim 18, wherein the separation device comprises a cup defining an interior with an opening facing toward the alignment trough to engage the bottom food product, the interior of the cup defining an orifice opening in a lateral direction for reducing pressure within the cup.

20. The apparatus of claim 19, wherein the cup comprises a cylindrical sidewall defining the interior, and a core extending within the sidewall, and wherein the orifice is defined by at least one of the sidewall and the core.

21. The apparatus of claim 18, wherein the separation device is configured to move the bottom food product separated from the remainder of the stack to a slide, and further comprising a driver configured to engage and move the bottom food product separated from the remainder of the stack down the slide to the chute.

* * * * *